(12) United States Patent
Yamashita et al.

(10) Patent No.: US 12,423,802 B2
(45) Date of Patent: Sep. 23, 2025

(54) DEFECT DISCRIMINATION APPARATUS FOR PRINTED IMAGES AND DEFECT DISCRIMINATION METHOD

(71) Applicant: SEIKO EPSON CORPORATION, Tokyo (JP)

(72) Inventors: Mitsuhiro Yamashita, Matsumoto (JP); Takahiro Kamada, Matsumoto (JP); Naoki Hagihara, Shiojiri (JP); Takuya Ono, Shiojiri (JP); Yuko Yamamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 408 days.

(21) Appl. No.: 18/176,299

(22) Filed: Feb. 28, 2023

(65) Prior Publication Data
US 2023/0281797 A1 Sep. 7, 2023

(30) Foreign Application Priority Data
Mar. 1, 2022 (JP) .................. 2022-030675

(51) Int. Cl.
*G06T 7/00* (2017.01)
(52) U.S. Cl.
CPC .... *G06T 7/001* (2013.01); *G06T 2207/20081* (2013.01)
(58) Field of Classification Search
CPC ............ G06T 7/001; G06T 2207/20081
See application file for complete search history.

(56) References Cited

U.S. PATENT DOCUMENTS

2020/0202225 A1* 6/2020 Nagato ............... G06V 10/776
2020/0402221 A1* 12/2020 Ijiri ....................... G06N 3/084

FOREIGN PATENT DOCUMENTS

JP 2019-101540 A 6/2019
JP 2019-152948 A 9/2019

* cited by examiner

*Primary Examiner* — Quang N Vo
(74) *Attorney, Agent, or Firm* — WORKMAN NYDEGGER

(57) ABSTRACT

Prepare a learning model that has been trained to output similarity for each defect species by machine learning using a teacher image that is an image containing a defect occurring during printing and that is associated with a defect species in advance. Then, a target image is prepared for inspection by acquiring an image of printed matter that has been printed. By using the learning model with respect to this target image, the similarity of the defect present in the target image to a known defect species is acquired, and this similarity is used to discriminate the defect present in the target image as at least one of the known defect species. When updating the learning model based on this discrimination result, the learning model is made to perform machine learning for a defect species that is different from the discriminated defect species or that is associated with an unknown defect.

15 Claims, 20 Drawing Sheets

KSp_ConvVN1

| LABEL/ CLASS i | SPECIFIC LAYER j | PARTIAL REGION k | DATA NUMBER q | KNOWN FEATURE INFORMATION KSp |
|---|---|---|---|---|
| 1 | 1 | 1 | 1 | ................. |
| ... | ... | ... | ... | ................. |
| 1 | 1 | 1 | max1 | ................. |
| ... | ... | ... | ... | ................. |
| 1 | 1 | 144 | 1 | ................. |
| ... | ... | ... | ... | ................. |
| 1 | 1 | 144 | max1 | ................. |
| 2 | 1 | 1 | 1 | ................. |
| ... | ... | ... | ... | ................. |
| 2 | 1 | 1 | max2 | ................. |
| ... | ... | ... | ... | ................. |
| 2 | 1 | 144 | max2 | ................. |
| 8 | 1 | 1 | 1 | ................. |
| ... | ... | ... | ... | ................. |
| 8 | 1 | 1 | max3 | ................. |
| ... | ... | ... | ... | ................. |
| 8 | 1 | 144 | 1 | ................. |
| ... | ... | ... | ... | ................. |
| 8 | 1 | 144 | max3 | ................. |

$i=1, j=1, k=1\sim144$ $i=2, j=1, k=1\sim144$ $i=8, j=1, k=1\sim144$

ConvVN1: J=1, k=1~144, q=1~max1
ConvVN2: J=2, k=1~9, q=1~max2
ClassVN: J=3, k=1, q=1~max3

FIG. 7

$Sclass(i,j) = max[G\{Sp(j,k=all), KSp(i,j,k=all,q=all)\}]$

| SPECIFIC LAYER j | | j=1 ConvVN1 | j=2 ConvVN2 | j=3 ClassVN |
|---|---|---|---|---|
| CLASS i | 1 | 0.88 | 0.82 | 0.80 |
| | 2 | 0.90 | 0.89 | <u>0.98</u> |
| | 3 | <u>0.95</u> | <u>0.97</u> | 0.90 |
| | 4 | 0.78 | 0.53 | 0.63 |
| | 5 | 0.61 | 0.77 | 0.81 |
| | 6 | 0.56 | 0.62 | 0.88 |
| | 7 | 0.84 | 0.81 | 0.66 |
| | 8 | 0.76 | 0.49 | 0.89 |

$S\_value(j) = max\{(Sclass(i=all,j)\}$ $RD\_ClassVN(D\_class, S\_value) = (2, 0.98)$ $RD\_ConvVN2(D\_class, S\_value) = (3, 0.97)$ $RD\_ConvVN1(D\_class, S\_value) = (3, 0.95)$

FIG. 10

A. TRAINING

B. ADDITIONAL LEARNING

C. REINFORCEMENT LEARNING

A. POST-TRAINED

B. POST ADDITIONAL LEARNING

C. POST REINFORCEMENT LEARNING

A. DIFFERENCE IMAGE OF UNKNOWN DIFECT SPECIES

B. DESCRIPTIVE INFORMATION

C. INFORMATION FOR TRAINING

DEFECT DISCRIMINATION APPARATUS FOR PRINTED IMAGES AND DEFECT DISCRIMINATION METHOD

The present application is based on, and claims priority from JP Application Serial Number 2022-030675, filed Mar. 1, 2022, the disclosure of which is hereby incorporated by reference herein in its entirety.

BACKGROUND

1. Technical Field

The present disclosure relates to a technique for identifying defects in printed images.

2. Related Art

JP-A-2019-101540 describes an apparatus that pre determines defects in printed materials by using machine learning, detects defects in actual printed materials, and displays necessary maintenance information for the printing apparatus.

However, the technology in JP-A-2019-101540 can only identify printed material defects that were the subject of training in advance and cannot handle unknown defects.

SUMMARY

This disclosure can be implemented in the following forms or applications.

One embodiment of this disclosure is a form as a defect discrimination apparatus for a printed image. Such a defect discrimination apparatus for printed images includes a learning model that has undergone machine learning using a teacher image, the teacher image containing a defect that may occur during printing and being associated with a defect species, the learning model being configured to output similarity for each defect species; a target image acquisition section that acquires an image of printed matter, which has been printed, and that prepares a target image to be an inspection target; a discriminator that, with respect to the target image, uses the learning model to acquire similarity of a defect present in the target image to the defect species, and that discriminates the defect present in the target image as at least one known defect species; and a learning section that, when based on the discrimination result by the discriminator it is determined that the learning model needs teaching, causes the learning model to undergo machine learning for a defect species that is different from the discriminated defect species or for a defect species that is associated with an unknown defect.

Another embodiment of the present disclosure is an aspect as a defect discrimination method for printed images. Such a defect discrimination method for printed images includes, preparing a learning model that has undergone machine learning using a teacher image, the teacher image containing a defect that may occur during printing and being associated with a defect species, the learning model being configured to output similarity for each defect species; acquiring an image of printed matter, which has been printed, and preparing a target image as an inspection target; using, with respect to the target image, the learning model to acquire similarity of a defect present in the target image to a defect species, and discriminating the defect present in the target image as at least one of a known defect species; and when based on the discrimination result it is determined that the learning model needs teaching, performing machine learning for a defect species that is different from the discriminated defect species or for a defect species that is associated with an unknown defect.

BRIEF DESCRIPTION OF THE DRAWINGS

FIG. 7 is an explanatory diagram showing a configuration of known feature information.

FIG. 10 is an explanatory diagram showing an example of a calculation method of the class specific similarity.

DESCRIPTION OF EMBODIMENTS

A. First Embodiment

1. System Configuration

Figure 1:
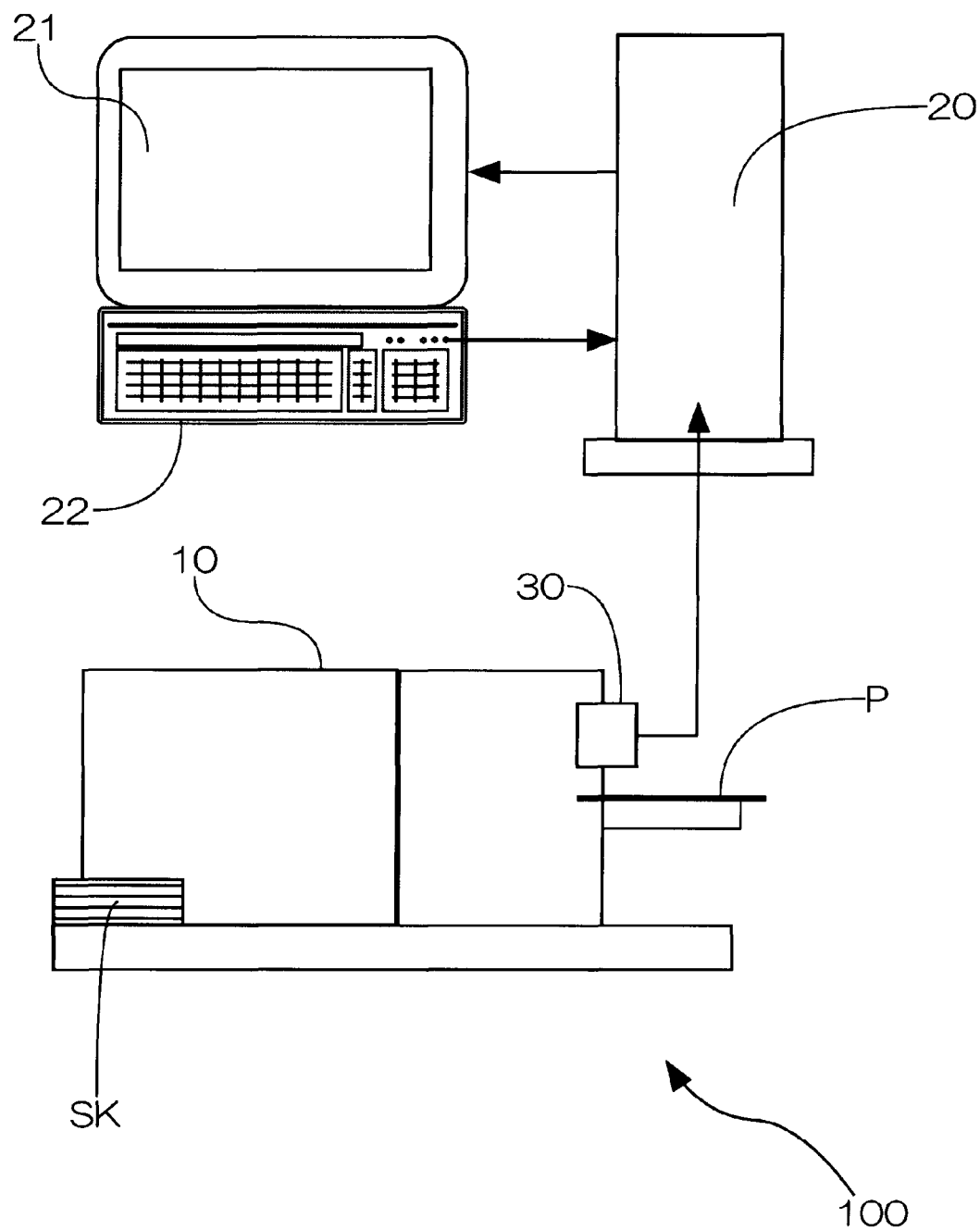
FIG. 1 is a block diagram of a class discrimination system according to an embodiment.

FIG. 1 is a block diagram showing a schematic configuration of a defect discrimination system 100 for inspection images in one embodiment. The defect discrimination system 100 is a printing system having a printer 10, an information processing apparatus 20, and a scanner 30 as an imaging section. When the printer 10 receives image data to be printed from the information processing apparatus 20, the printer 10 transports a print medium P stored in the stack SK and prints the image on the print medium P. Any method of image formation on the print medium P is acceptable. The printing may be performed, for example, by an inkjet method in which ink droplets are ejected onto the print medium P, by a xerography method in which a latent image is formed on a photosensitive drum and the toner is transferred onto the print medium P, or by a flat plate printing method in which a flat plate or the like is prepared and ink is transferred. An image output to the printer 10 for printing corresponds to a reference image, and an image printed on the print medium P and scanned by the scanner 30 corresponds to an inspection image. However, as will be described later, in the inspection, since the difference between the reference image and the inspection image is processed, the format of both images must be the same. For example, if an original image org to be printed is in RGB format with resolution r1, and a printed image prt actually printed on the print media P is in CMYK format with resolution r2, and a captured image scg to be read by the scanner 30 is in RGB format with resolution r3, then the captured image scg read by the scanner 30 should be the inspection image and the original image org converted to resolution r3 should be the reference image. Alternatively, a reference image may be prepared by scanning, with the scanner 30, an image that was printed by the printer 10 in a state in which it was confirmed that no defects will occur.

The scanner 30 is installed inside the printer 10 or at the location where the printed print medium P will be discharged and can scan the printed surface of the print medium P to capture the inspection image. In this disclosure, the inspection image obtained by the scanner 30 is used to generate a difference image by taking the difference from the reference image. The difference image is input to a machine learning model described later. The information processing apparatus 20 executes a discrimination process for a class of defect species using the machine learning model, and discriminates whether a defect species present in the image formed on the print medium P corresponds to any of multiple classes correspond. "Class of defect species" means a type of defect present in the printed image. The information processing apparatus 20 controls the printer 10 to execute printing under appropriate printing conditions according to the type of print medium P. The defect discrimination system for inspection images according to this disclosure can also have a system configuration that does not include the printer 10. In addition, a camera or other device can be used instead of the scanner 30. Since the inspection can be performed without generating the difference image, the image to be used to discriminate the defect species will sometimes simply be referred to as a "target image".

Figure 2:
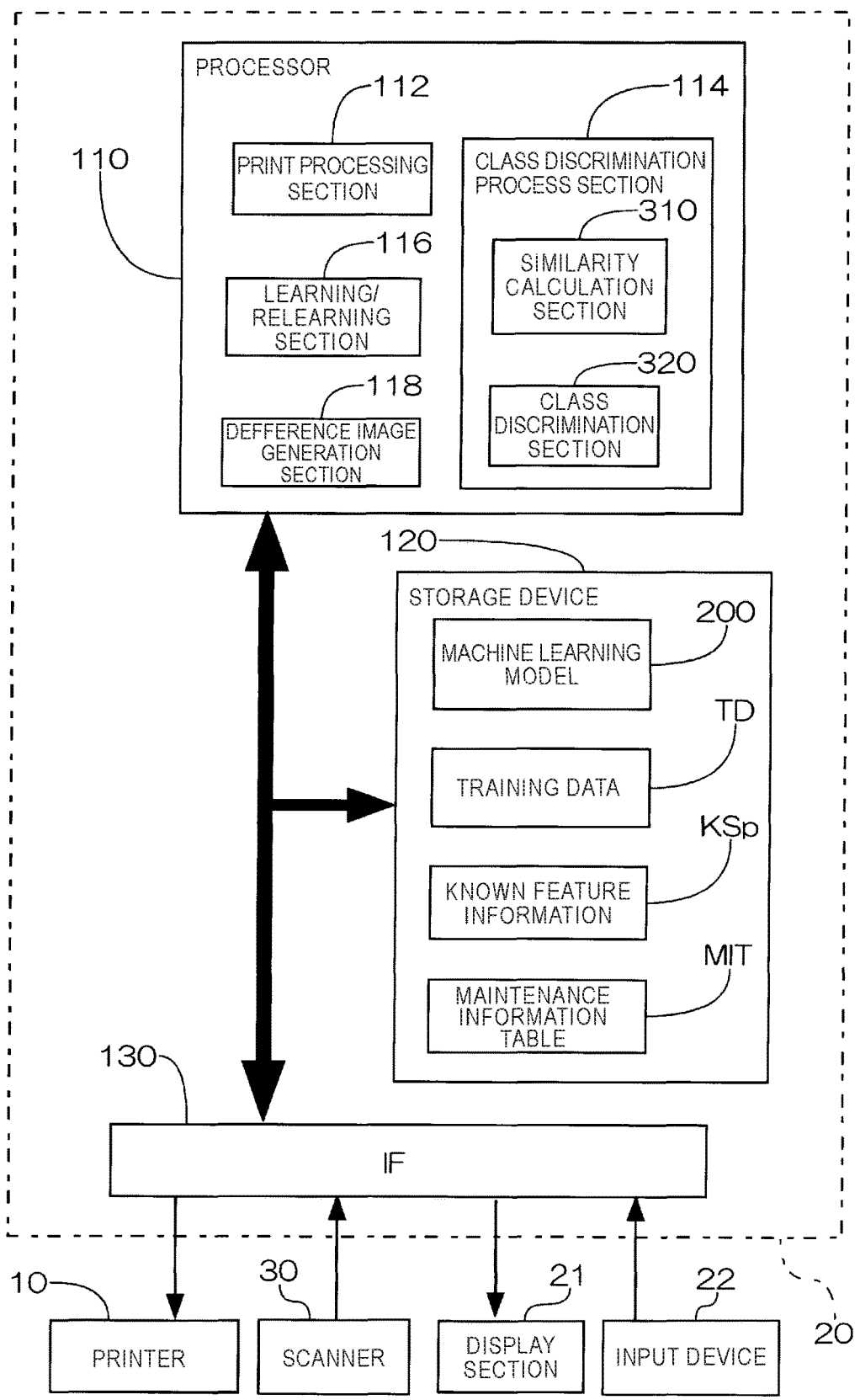
FIG. 2 is a block diagram of an information processing apparatus.

FIG. 2 is a block diagram showing the functions of the information processing apparatus 20. The information processing apparatus 20 has a processor 110, a storage device 120, an interface circuit 130, and an input device 22 and a display section 21, which are connected to the interface circuit 130. The scanner 30 and the printer 10 are also connected to the interface circuit 130. Although not limiting, for example, the processor 110 not only has a function of executing a process to be described in detail below, but also has a function of displaying on the display section 21 the data obtained by said process, the data generated during stages of said process, and the maintenance information of the printer 10 resulting from said process.

The processor 110 functions as a print processing section 112, a class discrimination process section 114, a learning/relearning section 116, a difference image generation section 118, and the like. The print processing section 112 realizes a function of using the printer 10 to execute the process of printing the original image that was input from the input device 22. Further, the class discrimination process section 114 executes a process to discriminate a defect species that may be present in the image printed on the print medium P. The class discrimination process section 114 includes a similarity calculation section 310 and a class determination section 320. The learning/relearning section 116 causes the learning model 200 stored in the storage device 120 to perform relearning. Relearning includes at least one of various types of learning for modifying the post-trained learning model, such as reinforcement learning, additional learning, and transfer learning. The difference image generation section 118 generates a difference image by extracting the difference between the reference image and the inspection image described above. Although the difference image generation section 118 generates the difference image between the reference image and the defective image or the inspection image, when the difference image is not used, the inspection image shall be the target image and the difference image generation section 118 may not be used.

The "reference image" is the image to be printed and does not contain any defect species. As will be described in detail later, the "defect species" is a partial event that is caused by printing with the printer 10, that is different from the reference image, and that impairs the quality of the printed image. In addition to known defect species that the machine learning model 200 has learned, there are also unknown defect species that the machine learning model 200 has not learned but are recognized as defects by those who inspect the image. A "defective image" is an image that contains these known or unknown defect species. An "inspection image" is an image to be inspected, regardless of the presence or absence of defect species and, here, an image printed according to the original image then scanned by the scanner 30. Therefore, the difference image obtained by taking difference between a defective image and a reference image for training purposes will always contain defect species, but the difference image between a reference image and an inspection image may not always contain defect species and may not contain defects. Again, if the inspection image is a predetermined specific image, it is possible to determine defect species without using a difference image. In this case, the inspection image should be used as is as the target image. The "reference image" is not limited to the images that can be visually observed, but includes data that can be processed by the information processing apparatus 20 or the like when obtaining a difference with the inspection image.

These sections 112 to 118 are realized by the processor 110 executing a computer program stored in the storage device 120. However, these sections 112 to 118 may be realized by hardware circuitries. In this specification, processor is a term that also includes such hardware circuitry.

The processor that executes the class discrimination process may be a processor contained in a remote computer connected to the information processing apparatus 20 via a network.

The storage device 120 stores the machine learning model 200, teacher data (training data) TD, known feature information Ksp, and maintenance information table MIT. The machine learning model 200 is used for processing by the class discrimination process section 114. An example configuration and operation of the machine learning model 200 will be described later. The training data TD is a set of labeled data used to train the machine learning model 200. In this embodiment, the training data TD is a set of difference images corresponding to defect species. The known feature information KSp is a set of feature spectrums obtained when the training data TD is input to the post-trained machine learning model 200. The feature spectrum will be described later. The maintenance information table MIT is a table in which is registered information indicating details of maintenance to be performed on the printer 10, when a defect is detected in a printed image. The information indicating details of maintenance is displayed on the display section 21 and presented to the user. Such information may include not only text but also images, video, and audio.

2. Configuration of Machine Learning Model

Figure 3:
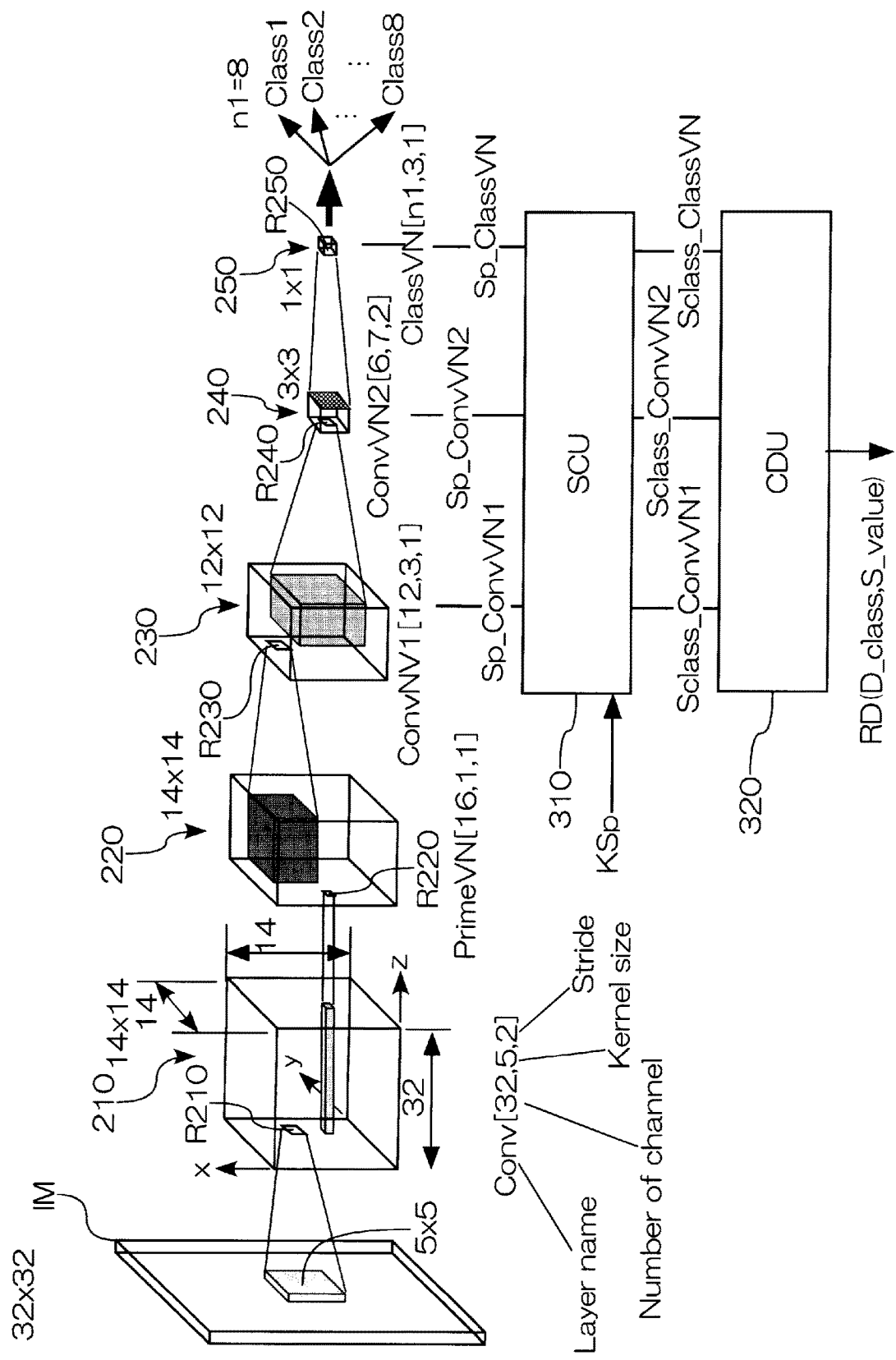
FIG. 3 is an explanatory diagram showing a configuration of a machine learning model.

FIG. 3 is an explanatory diagram showing a configuration of the machine learning model 200. In this machine learning model 200, the input data IM is a two dimensional array of data. This machine learning model 200 has, in order from the input data IM side, a convolutional layer 210, a primary vector neuron layer 220, a first convolutional vector neuron layer 230, a second convolutional vector neuron layer 240, and a classification vector neuron layer 250. Of these five layers 210 to 250, the convolutional layer 210 is the lowest layer and the classification vector neuron layer 250 is the highest layer. In the following description, layers 210 to 250 are also referred to as "Cony layer 210", "PrimeVN layer 220", "ConvVN1 layer 230", "ConvVN2 layer 240", and "ClassVN layer 250", respectively.

The Conv layer 210 is a layer composed of scalar neurons. The other four layers 220 to 250 are layers composed of vector neurons. Vector neurons are neuron whose input and output are vectors. Hereinafter, the term "node" is used as a superordinate concept for scalar neurons and vector neurons.

In this embodiment, since the input data IM is image data, the input data IM is a two dimensional array of data. For example, the input data IM is image data of 32 pixels×32 pixels. Each pixel may have only a luminance value or may have data in RGB format.

The example in FIG. 3 uses two convolutional vector neuron layers 230 and 240, but the number of the convolutional vector neuron layers is arbitrary or the convolutional vector neuron layers may be omitted. However, it is desirable to use one or more convolutional vector neuron layers. The configuration of each of the layers 210 to 250 in FIG. 3 can be described as follows.

Description of Composition of Each Layer
    Conv layer 210: Conv[32, 5, 2]
    PrimeVN layer 220: PrimeVN[16, 1, 1]
    ConvVN1 layer 230: ConvVN1[12, 3, 1]
    ConvVN2 layer 240: ConvVN2 [6, 7, 2]
    ClassVN layer 250: ClassVN[n1, 3, 1]
    Vector dimension VD: VD=16

In each of these descriptions of layers 210 to 250, the character string before the parentheses is a layer name, and the numbers in the parentheses are, in order, number of channels, kernel surface size, and stride. For example, the layer name of the Conv layer 210 is "Conv", the number of channels is 32, the kernel surface size is 5×5, and the stride is 2. In FIG. 3, these descriptions are shown below each layer. The number of channels is the number of neuron layers in each layer, and since the Conv layer 210 is composed of scalar neurons, it is indicated as Kernel in FIG. 3, and since the other layers 220 to 250 are composed of vector neurons, the number of channels is indicated as VN. The hatched rectangle drawn in each layer represents the surface size of the kernel used to calculate output vectors to be output to the adjacent upper layer. In this embodiment, since the input data IM is a two dimensional array of image data, the surface size of the kernel is also two dimensional. In the above description, the dimension of the output vector of each vector neuron is constant at 16. Note that the values of the parameters used in the description of each layer 210 to 250 are examples and can be changed arbitrarily.

In FIG. 3, the Conv layer 210 shows a first axis x and a second axis y, which define the plane coordinates of the node array, and a third axis z, which represents depth. Also shown are the sizes of the Conv layer 210 in the x, y, and z directions of 14, 14, and 32, respectively. The size in the x direction and the size in the y direction are called "resolution". In this embodiment, the resolutions in the x-direction and in the y-direction are identical in each layer. In FIG. 3, the resolution is shown above each layer. Specifically, the Conv layer 210 is 14×14, the PrimeVN layer 220 is 14×14, the ConvNV1 layer 230 is 12×12, the ConvNV2 layer 240 is 3×3, and the ClassVN layer 250 is 1×1. The size in the z direction is the number of channels. These three axes x, y, and z are also used as coordinate axes for the position of each node in the other layers. However, in FIG. 3, these axes x, y, and z are not shown in layers other than the Conv layer 210.

As is well known, a resolution W1 in the x and y directions after convolution is given by following formula.

$$W1 = \text{Ceil}\{(W0-Wk+1)/S\} \tag{1}$$

Here, W0 is the resolution of a target of the convolution process, Wk is the surface size of the kernel, S is the stride, and Ceil {X} is the function that performs the operation of rounding up X. Taking the Conv layer 210 as an example, because W0=32, Wk=5, and S=2, the following is established.

$$W1 = \text{Ceil}\{(32-5+1)/2\} = 14$$

The resolutions of the layers shown in FIG. 3 are examples when the resolution of the input data IM in the y direction is 32, and the actual resolution of each layer will change appropriately according to the size of the input data IM.

The ClassVN layer 250 has n1 number of channels. In the example of FIG. 3, n1=3. In general, n1 is an integer greater than or equal to 2 and is the number of known classes that can be discriminated by using the machine learning model 200. The three channels of the ClassVN layer 250 output decision values Class1 to Class8 for the eight known classes (defect species in this embodiment). Normally, the class having the largest value among the decision values Class1 to Class8 is used as a class discrimination result of the input data IM. If the largest value among the decision values Class1 to Class8 is less than a predetermined threshold value, the class of the input data IM may be determined to be unknown.

In this disclosure, as will be described later, instead of using the decision values Class1 to Class8 of the output layer, the ClassVN layer 250, the discrimination class, the type of defect (defect species) in this embodiment, is determined by using the class specific similarity calculated from the output of a specific vector neuron layer.

FIG. 3 further shows the partial regions Rn in each layer 210, 220, 230, 240, and 250. The subscript "n" of the partial region Rn is the layer number of each layer. For example, the partial region R210 indicates a partial region in the Conv layer 210. The "partial region Rn" is a region in each layer that contains a plurality of channels along the third axis z, at a planar position (x, y) defined by the position x of the first axis x and the position y of the second axis y. The partial region Rn has a dimension of "Width"דHeight"דDepth" corresponding to the first axis x, the second axis y, and the third axis z. In this embodiment, the number of nodes in one "partial region Rn" is "1×1×number of depth", that is, the "1×1×number of channels".

As shown in FIG. 3, feature spectrum Sp_ConvVN1, which will be described later, is calculated from the output of the ConvVN1 layer 230 and is input to the similarity calculation section 310. Similarly, feature spectrum Sp_ConvVN2 and Sp_ClassVN are calculated from the outputs of the ConvVN2 layer 240 and the ClassVN layer 250, respectively, and are input to the similarity calculation section 310. The similarity calculation section 310 calculates the class specific similarities Sclass_ConvVN1, Sclass_ConvVN2, and Sclass_ClassVN, which will be described later, by using the feature spectrum Sp_ConvVN1, Sp_ConvVN, and Sp_ClassVN and known feature information KSp created in advance. The class determination section 320 generates the discrimination result RD using at least a part of the class specific similarities Sclass_ConvVN1, Sclass_ConvVN2, and Sclass_ClassVN. The discrimination result RD includes a discrimination class D_class and a similarity value S_value corresponding to the discrimination class D_class.

In this disclosure, the vector neuron layers used to calculate similarity are also referred to as the "specific layer". Any number of one or more vector neuron layers can be used as the specific layer. The configuration of the feature spectrum, the calculation method of the similarity using the feature spectrum, and the method of determining the discrimination class will be described later.

Figure 4:
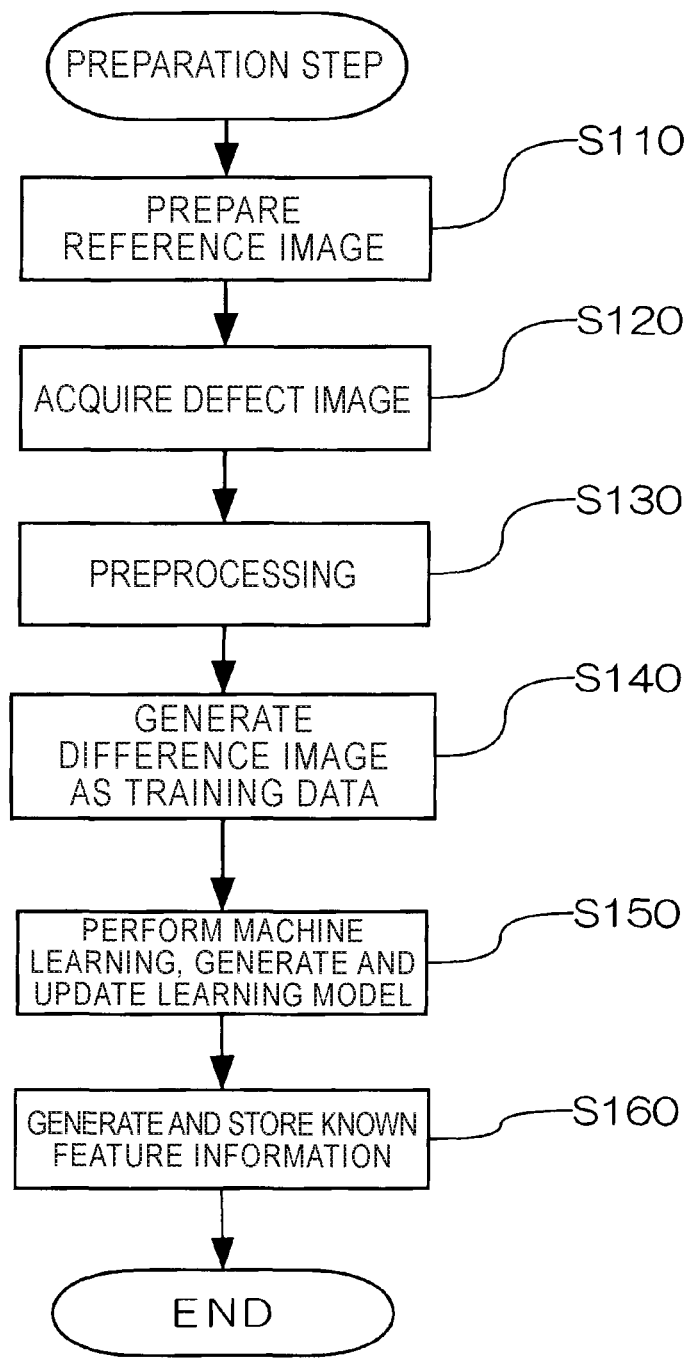
FIG. 4 is a flowchart showing the preparation step of the machine learning model.

FIG. 4 is a flowchart showing a process procedure of a preparation step of the machine learning model. This preparation step is, for example, a process performed by the manufacturer of the printer 10. When this process is started, first, a process of preparing a reference image is performed (step S110). This process is not an internal process of the information processing apparatus 20, but the necessary reference images are selected for machine learning.

Next, a process of acquiring a defective image corresponding to the reference image is performed (step S120). The reference image is the original image to be printed by the printer 10, and the defective image is the image containing defects that may occur when the reference image is printed by the printer 10. In this embodiment, in order for various defects that may occur due to printing by the printer 10 to be learned, the reference image and a defective image corresponding to these are required when preparing the learning model. In this embodiment, in step S120, the defective images are acquired by reading, with the scanner 30, images in which the defects have occurred.

For example, the following defects are assumed as possible defects caused by the printer 10.
(1) banding
(2) dripping
(3) missing nozzle
(4) pinhole
(5) foreign substance
(6) distortion
(7) cockling
(8) color variation The defective images can be obtained by printing the reference image using the same type of printer 10 that produced each defect, and then reading them with the scanner 30. The reference image may be obtained by printing the original image data in RGB format using the printer 10 and reading it by the scanner 30, or by generating an image equivalent to the printed image by simulation from the original image in RGB format.

After obtaining the reference image and the defective image, preprocessing is performed on the reference image that was obtained in step S110 and the defective image that was obtained in step S120 (step S130). Here, preprocessing means at least one of the following processes, but in this embodiment, all of the processes are performed.
(A) Level correction: a correction to match the levels of brightness, hue, saturation, and the like between the reference image and the defective image. Originally, both images are the same overall, but since the scanner 30 is used to read the image, the levels may need to be matched.
(B) Geometric correction: a correction for making the reference image and the defective image geometrically identical. Corrections are made to adjust the magnification of both images and to correct distortion.
(C) Alignment: the position of the reference image and the defective image may shift due to bending of the paper in the transport direction when printing with the printer 10, or due to the reading angle of the scanner 30. In order to correct this, the position of both images is matched by translational correction, rotational correction, or the like of the images.

After such preprocessing (step S130), a difference image between the reference image and the defective image is generated using the difference image generation section 118 and prepared as the training data (step S140). It is acceptable to perform the process steps S110 through S140 above separately and prepare the difference images corresponding to the defect species in advance. This difference image is the training data TD used in the training performed by the class discrimination process section 114.

The class discrimination process section 114 performs machine learning using the plurality of training data TD prepared in this manner, and generates and updates the machine learning model 200 (step S150). Each training data TD is labeled in advance. In this embodiment, it is assumed that labels corresponding to the defects (1) to (8) described above are assigned to each of the training data TD. These labels correspond to the eight classes, Class1 through Class8, of machine learning model 200. In this disclosure, "label" and "class" mean the same thing.

When training with the multiple training data TD is completed, the post-trained machine learning model 200 is stored in the storage device 120. When the training of the machine learning model 200 is completed, the next step is to input the plurality of training data TD to the post-trained machine learning model 200 again to generate the known feature information KSp, in step S160 of FIG. 4. The generated known feature information KSp is stored in the storage device 120. The known feature information KSp is a set of feature spectrum described below.

3. Generation of Known Feature Information

Figure 5:
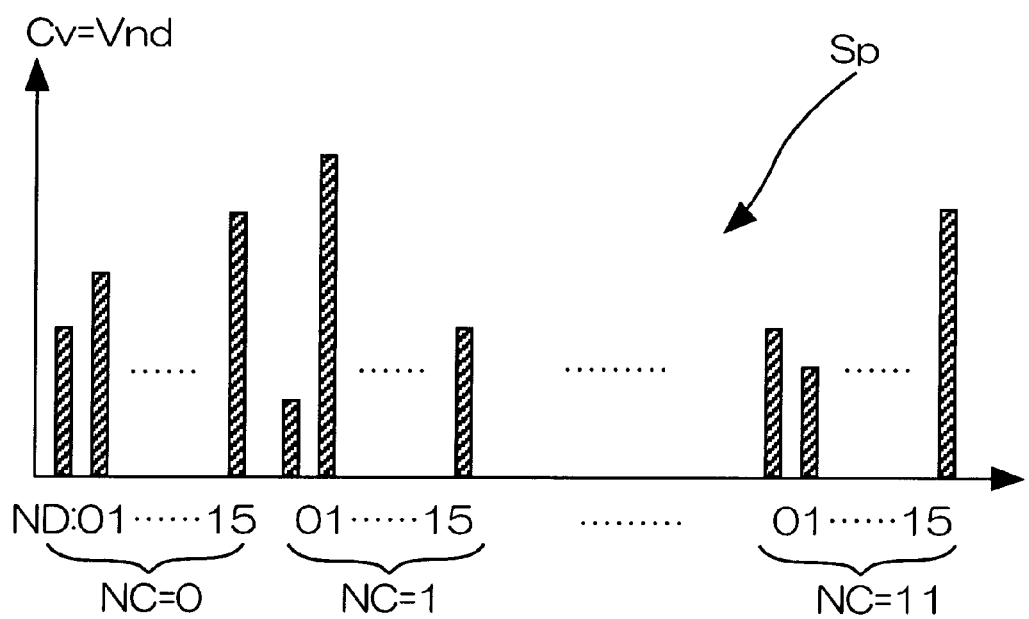
FIG. 5 is an explanatory diagram showing a feature spectrum.

FIG. 5 is an explanatory diagram showing the feature spectrum Sp obtained by inputting arbitrary input data to the post-trained machine learning model 200. Here, the feature spectrum Sp obtained from the output of the ConvVN1 layer 230 will be described. The horizontal axis in FIG. 5 is the position of the vector element with respect to the output vector of the multiple nodes included in one partial region R230 of the ConvVN1 layer 230. The position of this vector element is represented by the combination of the element number ND of the output vector at each node and the channel number NC. In this embodiment, since the vector dimension is 16, the element number ND of the output vector is 16, from 0 to 15. Since the number of channels in the ConvVN1 layer 230 is 12, the channel number NC is 12, from 0 to 11. In other words, this feature spectrum Sp is an array of multiple element values of an output vector of each vector neuron included in one partial region R230, over multiple channels along the third axis z.

The vertical axis in FIG. 5 shows feature value $C_V$ at each spectral location. In this example, the feature value $C_V$ is a value $V_{ND}$ of each element of the output vectors. The feature value $C_V$ may be a value obtained by multiplying a value $V_{ND}$ of each element of the output vector by a normalization coefficient, or the normalization coefficient may be used as it is. In the latter case, the number of feature values $C_V$ in the feature spectrum Sp is equal to the number of channels, which is 12. The normalization coefficient is a value corresponding to the vector length of the output vector of that node.

The number of feature spectrum Sp obtained from the output of the ConvVN1 layer 230 for one input data is equal to the number of planar positions (x, y) of the ConvVN1 layer 230, that is, the number of partial regions R230, so the number of feature spectrum Sp is 12×12 (144). Similarly, for one input data, 3×3 (9) feature spectrum Sp are obtained from the output of ConvVN2 layer 240, and one feature spectrum Sp is obtained from the output of the ClassVN layer 250.

When the training data TD is input again to the post-trained machine learning model 200, the similarity calculation section 310 obtains the feature spectrum using the same method as that used to calculate the feature spectrum Sp shown in FIG. 5. This feature spectrum is different from the feature spectrum required when actually detecting and discriminating the defect species, and is prepared in advance. Therefore, to distinguish between the two, this feature spectrum is hereinafter referred to as known feature information.

Figure 6:
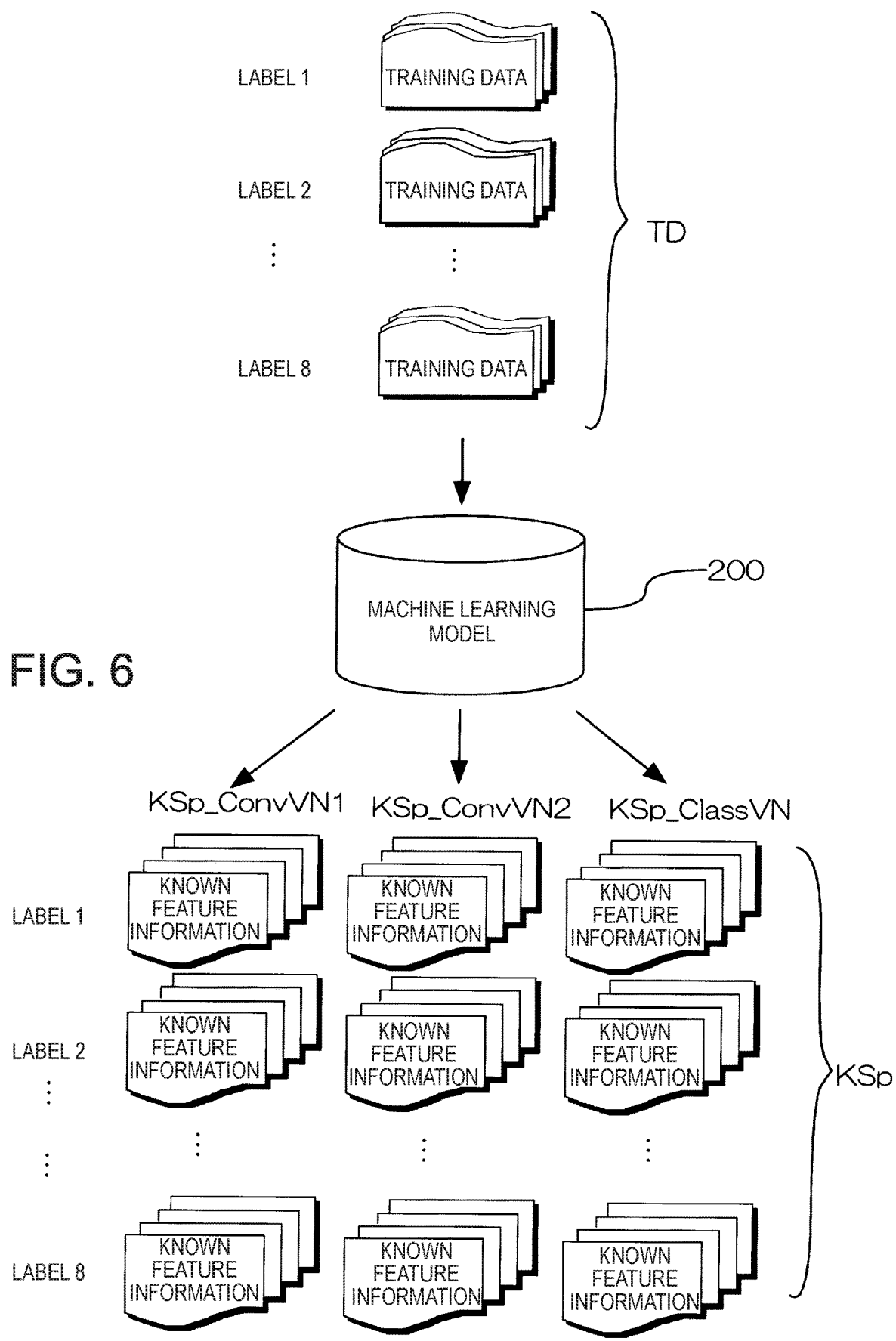
FIG. 6 is an explanatory diagram showing how known feature information is created by using training data.

FIG. 6 is an explanatory diagram showing how the known feature information KSp is created using the training data TD. In this example, by inputting the training data TD with labels 1 through 8 into the post-trained machine learning model 200, the known features information KSp_ConvVN1, KSp_ConvVN2, and KSp_ClassVN, each mapped to a label or class, are obtained from output of three vector neuron layers, namely ConvVN1 layer 230, ConvVN2 layer 240, and ClassVN layer 250. These known feature information KSp_ConvVN1, KSp_ConvVN2, and KSp_ClassVN are stored in the storage device 120 as the known feature information KSp.

FIG. 7 is an explanatory diagram showing a configuration of the known feature information KSp. In this example, the known feature information KSp_ConvVN1 obtained from the output of the ConvVN1 layer 230 is shown. The known feature information KSp_ConvVN2 obtained from the output of the ConvVN2 layer 240 and the known feature information KSp_ClassVN obtained from the output of the ClassVN layer 250 have a similar configuration, but are not shown in FIG. 7. The known feature information KSp obtained from the output of at least one vector neuron layer should be registered as the known feature information KSp.

Each record of the known feature information KSp-_ConvVN1 contains a parameter i indicating an order of labels or classes, a parameter j indicating an order of specific layers, a parameter k indicating an order of a partial region Rn, a parameter q indicating date number, and a component of the known feature information. The component of the known feature information is the component corresponding to the data number q for each partial region k of the known feature information KSp_ConvVN1 which is corresponding to each label or class.

The parameter i of the class takes the same value of 1 through 8 as the label. The parameter j of the specific layer takes a value from 1 through 3 indicating which of the three specific layers 230, 240, 250 it is. The parameter k of the partial region Rn takes a value indicating which one of the multiple partial regions Rn in the each specific layers, that is, which one of the plane positions (x, y), it is. For the ConvVN1 layer 230, the number of the partial regions R230 is 144, so k=1 to 144. The parameter q of the date number indicates the number of the training data with the same label, and takes a value of 1 through max1 for the class 1, 1 through max2 for the class 2, . . . , 1 through max8 for class 8.

The multiple training data TD used in step S120 need not be the same as the multiple training data TD used in step S110. However, if some or all of the multiple training data TD used in step S110 are also used in step S120, there is an advantage that there is no need to prepare new training data.

4. Defect Species Discrimination Process

Figure 8:
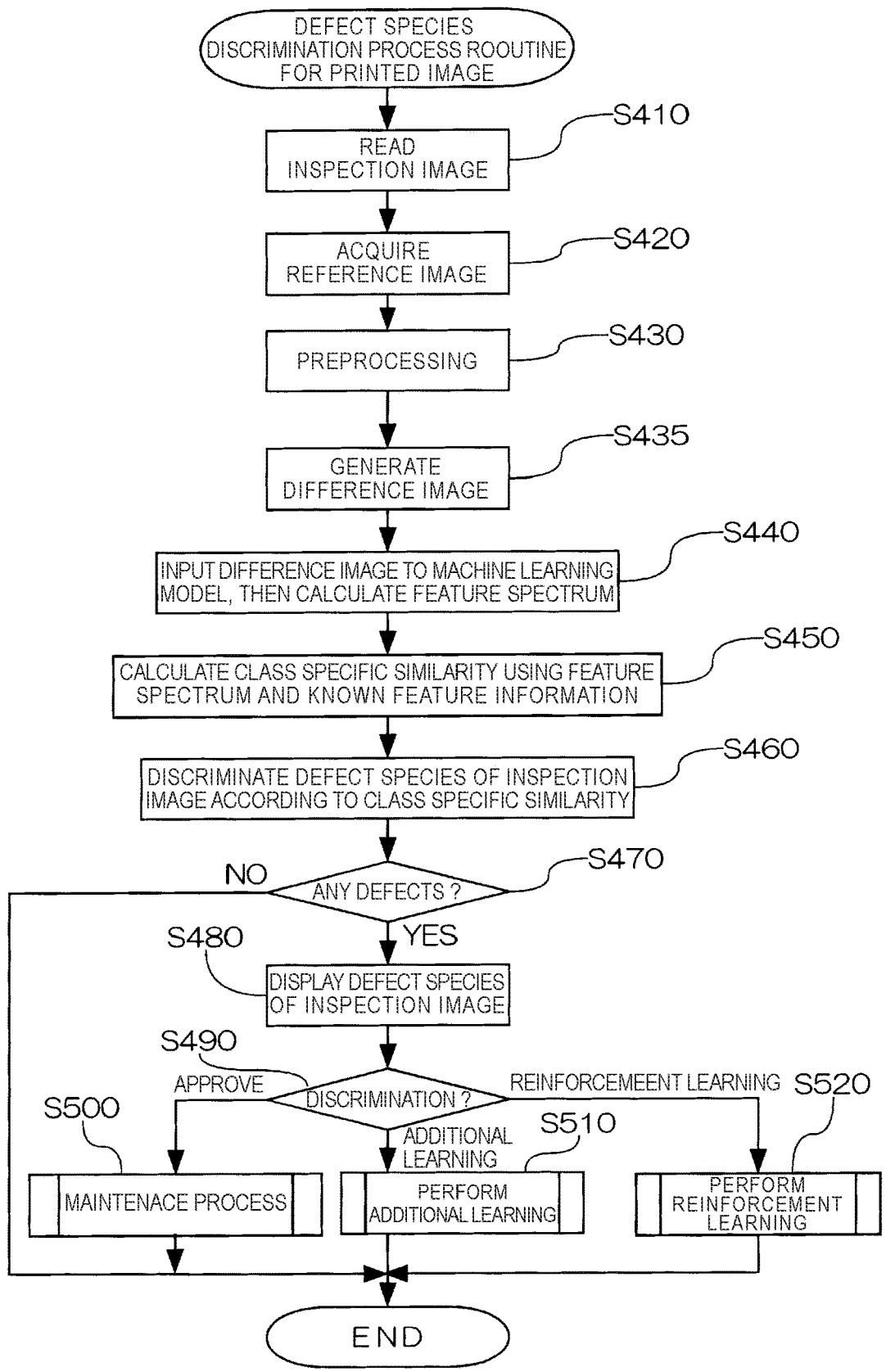
FIG. 8 is a flowchart showing a process procedure for defect species discrimination for printed images.

After the preparation described above, a process to discriminate the defect species that may occur in the image printed on the print medium P is performed. FIG. 8 is a flowchart showing the defect species discrimination process routine of the printed image by using the post-trained machine learning model. Although this process routine is shown mainly as a process of the processor 110 of the information processing apparatus 20, it can be performed in part as a process by the user of the printer 10. If the process can be performed by the user, this will be explained in each case.

The process shown in FIG. 8 is started when a desired image is printed by the printer 10. When this process is started, first, the printed image is read as an inspection image using the scanner 30 (step S410). This reading process may be performed each time an image is printed on the print medium P, or it may be performed by the user at a specific timing.

Next, a process of acquiring the reference image is performed (step S420). As already described, the reference image may be an image printed from the original image data in RGB format using a well maintained printer, that is, a printer which was compensated so that defective images do not occur, and then scanned with the scanner 30, or an image equivalent to the printed image may be generated from the original image data in RGB format through simulation. This operation is performed in advance before printing and is prepared as a reference image.

Next, preprocessing is performed on the inspection image and the reference image (step S430). This process is similar to step S130 of the preparation step shown in FIG. 4. After matching the position, size, rotation angle, and levels such as image brightness of the inspection image and the reference image through the preprocess, the difference image is generated (step S435). The difference image obtained in this way is used as the data to be discriminated for discriminating the defect species described below. The preprocessing may be performed automatically or by the user individually.

When the difference image, in other words, the data to be discriminated is generated, next, the class discrimination process section 114 inputs the data to be discriminated to the post-trained machine learning model 200 to calculate the feature spectrum Sp (step S440). Using the obtained feature spectrum Sp and the known feature information KSp generated and stored in step S160 of FIG. 4 described above, the similarity calculation section 310 calculates the class specific similarity (step S450).

Figure 9:
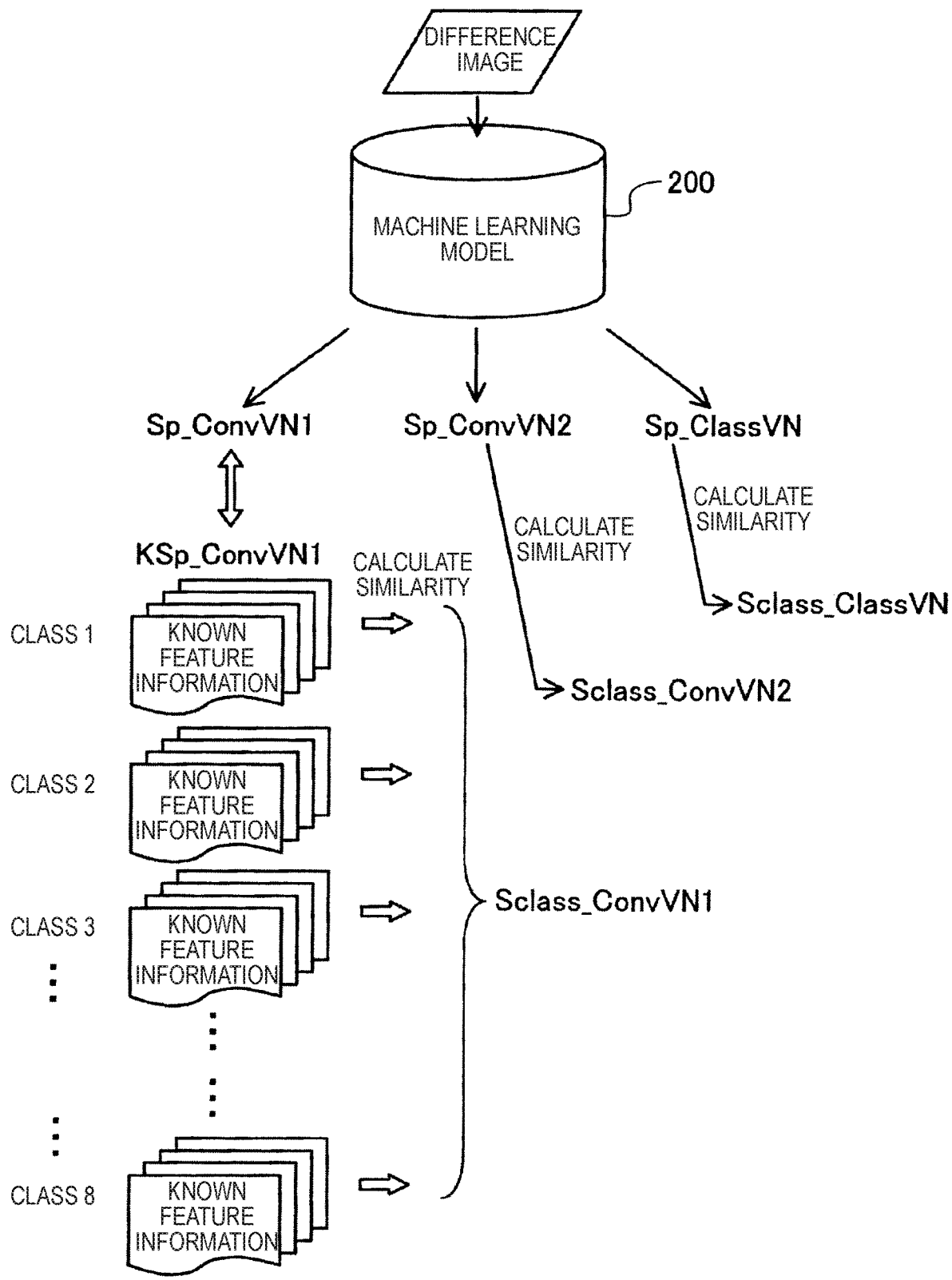
FIG. 9 is an explanatory showing how class specific similarity with respect to the data to be discriminated is obtained.

A method of calculating the class specific similarities will be described. FIG. 9 is an explanatory showing how class specific similarity with respect to the data to be discriminated is obtained. When the data to be discriminated is input to the machine learning model 200, the class discrimination process section 114 calculates feature spectrum Sp_ConvVN1, Sp_ConvVN2, and Sp_ClassVN from the outputs of the ConvVN1 layer 230, the ConvVN2 layer 240, and the ClassVN layer 250, respectively. Upon receiving this feature spectrum, the similarity calculation section 310 calculates the class specific similarity for each specific layer. Specifically, the class specific similarity Sclass_ConvVN1 is calculated using the feature spectrum Sp_ConvVN1 obtained from the output of the ConvVN1 layer 230 and the known feature information KSp_ConvVN1, the class specific similarity Sclass_ConvVN2 is calculated using the feature spectrum Sp_ConvVN2 obtained from the output of the ConvVN2 layer 240 and the known feature information KSp_ConvVN2, and the class specific similarity Sclass_SclassVN is calculated using the feature spectrum Sp_ClassVN obtained from the output of the ClassVN layer 250 and the known feature information KSp_ClassVN. In FIG. 9, the known feature information is described only for the ConvVN1 layer 230, but the class specific similarity is calculated for the ConvVN2 layer 240 and the ClassVN layer 250 using the same method.

It is not necessary to generate all of the class specific similarities Sclass_ConvVN1, Sclass_ConvVN2, and Sclass_ClassVN using each of the three vector neuron layers 230, 240, and 250, but it is desirable to use one or more of these three vector neuron layers to calculate the class specific similarities. As described above, in this disclosure, the vector neuron layers used to calculate the similarity are referred to as a "specific layer". As will be described below, in this embodiment, outputs from the three vector neuron layers 230, 240, and 250 are used to generate all the class specific similarities Sclass_ConvVN1, Sclass_ConvVN2, and Sclass_ClassVN, and these multiple class specific similarities are used to discriminate the class. Of course, any one or two outputs from the three vector neuron layers 230, 240, and 250 may be used to calculate any one or two of the class specific similarities Sclass_ConvVN1, Sclass_ConvVN2, and Sclass_ClassVN, and discriminate the defect species.

An example of such class specific similarity calculation method is described below. In this embodiment, as will be described below, the class specific similarity is obtained without considering the partial region Rn at all, but in addition to this method, the following methods are also known.

Calculation method for obtaining the class specific similarity without considering the correspondence between the feature spectrum Sp and the partial region Rn in the known feature information KSp Calculation method for obtaining the class specific similarity between the feature spectrum Sp and the corresponding partial region Rn of the known feature information KSp In the class specific similarity calculation method,
(1) For each class, obtain all the feature spectrum Sp, which are obtained from the output of the specific layer j according to the data to be discriminated, and the class specific similarity Sclass(i, j), which is the similarity with all the known feature information KSp associated with that specific layer j and each class i,
(2) For each class i, the maximum value of the multiple class specific similarities Sclass(i, j) is calculated as the similarity value S_value between the feature spectrum Sp and the known feature information KSp, and
(3) The class associated with the similarity value S_value that is the largest value over multiple classes i is determined as a discrimination class D_class.

FIG. 10 is an explanatory diagram showing a calculation method of the class specific similarities in this embodiment. In this calculation method, each class specific similarity Sclass(i, j) is calculated from the output of the specific layers, the ConvVN1 layer 230, the ConvVN2 layer 240, and the ClassVN layer 250, without considering local similarity.

The class specific similarity Sclass (i, j) obtained by this calculation method is calculated by using the following formula.

$$S\text{class}(i,j)=\max[G\{Sp(j,k=\text{all}),KSp(i,j,k=\text{all},q=\text{all})\}] \quad (2)$$

where Sp(j, k=all) is the feature spectrum obtained from the output of all the partial regions k of the specific layer j, according to the data to be discriminated. The function max[ ] is a function to find the maximum value of the elements in [ ].

In the example in FIG. 10, furthermore, the final discrimination result RD_ConvVN1 is determined from the class specific similarity Sclass(i, j). The discrimination result RD_ConvVN1 can be expressed in a format that includes the discrimination class D_class and the similarity value S_value corresponding to the discrimination class D_class. The similarity value S_value is obtained by taking the maximum value of the similarity values for the eight classes 1 through 8 in the class specific similarity Sclass(i, j). The discrimination class D_class is the class with the largest similarity value in the class specific similarity Sclass(i, j). As shown in FIG. 10, j=1, that is, in the vector neuron layer 230, the class specific similarity Sclass(3,1) of the class 3 is the value 0.95, which is the maximum value among all the classes, and thus the final discrimination result RD_ConvVN1 is as follows:

$$RD\_\text{ConvVN1}(D\_\text{class},S\_\text{value})=(3,0.95)$$

For the ConvVN2 layer 240 and the ClassVN layer 250, the class specific similarities Sclass_ConvVN2 and Sclass_ClassVN are calculated in the same way, and the final discrimination results RD_ConvVN2 and RD_ClassVN are determined for each layer.

Figure 11:
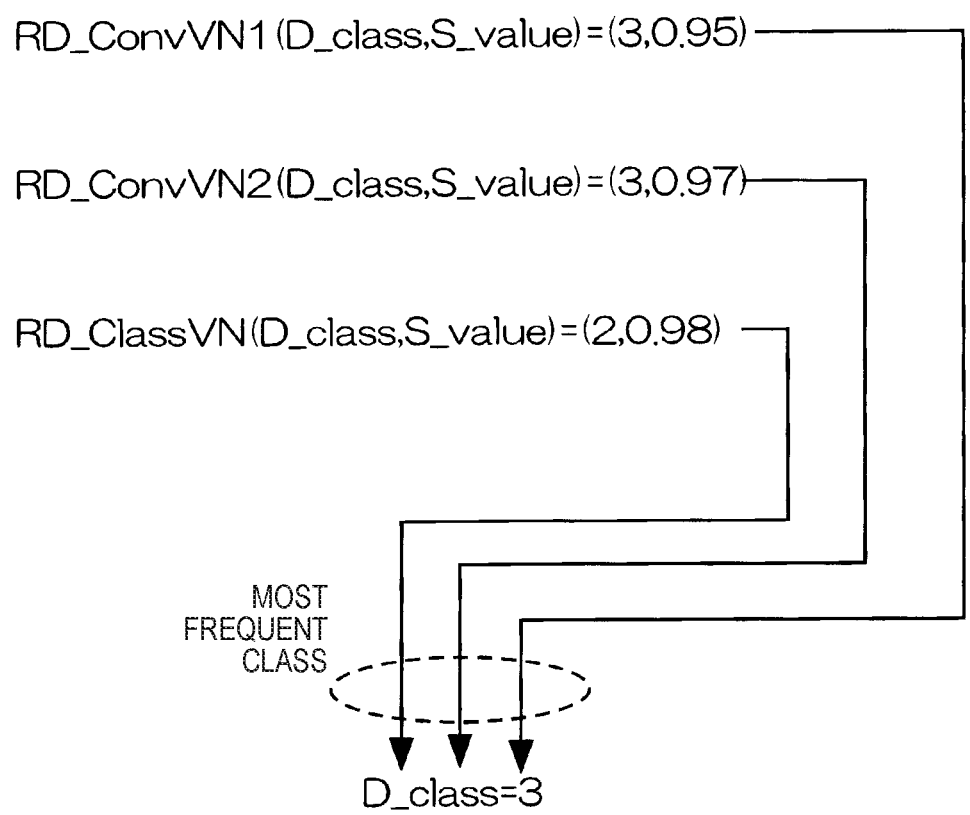
FIG. 11 is an explanatory diagram showing an example of a determination method of a discrimination class using a plurality of specific layers.

Thus, the outputs of the three vector neuron layers 230, 240, and 250 are used to obtain the class specific similarities Sclass_ConvVN1, Sclass_ConvVN2, and Sclass_ClassVN and the final discrimination results RD_ConvVN1, RD_ConvVN2, and RD_ClassVN. Then next, as shown in FIG. 11, most frequent class is obtained from the final discrimination results base on the outputs from these three vector neuron layers 230, 240, and 250. In this example, of the three vector neuron layers 230 through 250, the output of the vector neuron layers 230 and 240 are class 3, so the final discrimination result is class 3.

In step S460, the class determination section 320 determines, according to the class specific similarities obtained in step S450, the class of the difference image obtained from the inspection image and the reference image, that is, the type of the defect species present in the printed image. As previously mentioned, the following eight defect species are trained in the defect species discrimination results:

(1) banding
(2) dripping
(3) missing nozzle
(4) pinhole
(5) foreign substance
(6) distortion
(7) cockling
(8) color variation Here, each number corresponds to a class to be discriminated. In addition to the identification of these defect species, an output may be provided stating that none of the defect species were identified. In other words, if none of the defect species can be identified and the presence of unknown defects cannot be identified in the defect species discrimination result, this is taken as a class of "no defect species identified". Therefore, the classes related to the defect species discrimination may be treated as if there are finally a total of 9 classes with a class of "(0) no defect species identified".

The class of "no defect species identified" may be prepared as an output of the machine learning model 200, or it may be prepared as a class that is output in case none of outputs corresponding to the defect species (eight in this example) are above a predetermined similarity level.

After the defect species discrimination, a judgement is made as to whether the printed image has defects or not (step S470). If it is determined that there is no defect (step S470: "NO"), this embodiment will go straight to "END" and this processing routine is terminated. However, the user may determine whether the judgment that there are no defects is correct or not, then if the judgment is incorrect, additional learning may be performed as described below.

Figure 12:
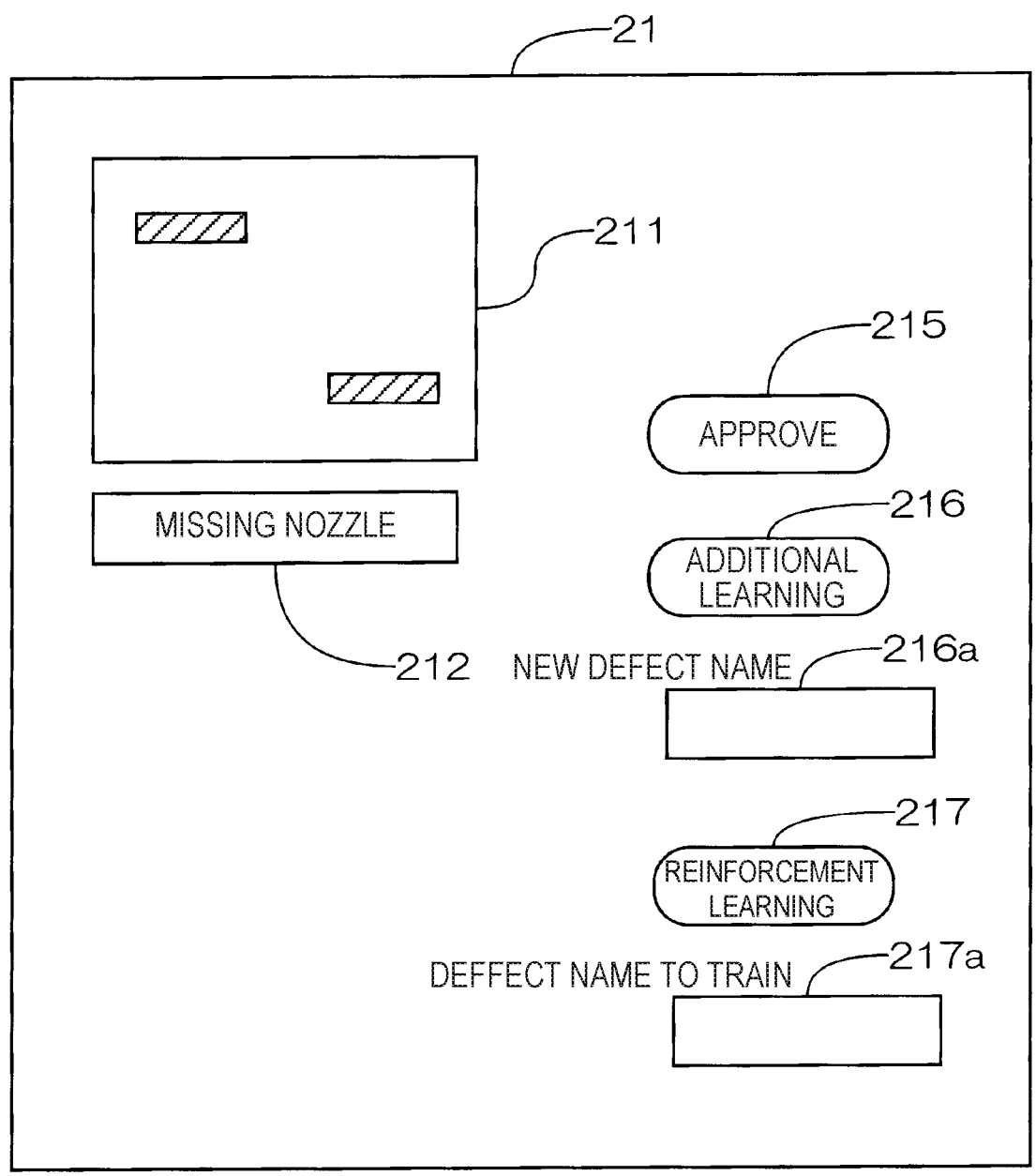
FIG. 12 is an explanatory diagram showing an example of a display of a determination result of a defect species.

If any defect species is found (step S470: "YES"), the defect species found in the printed inspection image is displayed on the display section 21 (step S480). FIG. 12 shows an example of display of such defect species. What is shown is an example of the defect species that was discriminated to be a missing nozzle. In this case, the defect species is displayed with the corresponding difference image 211. In other words, the display section 21 displays the difference image 211 generated in step S435 and the defect species discrimination result, in this case, the text "missing nozzle" 212. In the display section 21, there is an approval button 215 that indicates acceptance of the display result, an additional learning button 216 that instructs the user to perform additional learning of a new defect species, assuming that the defect species in the displayed image is not a known defect species, a field 216a for entering a defect name to be used as a label to indicate the new defect species for additional learning, a reinforcement learning button 217 that instructs the user to perform reinforcement learning to strengthen the discrimination of known defect species based on the displayed results, and a field 217a for selecting an existing label in a pop-up format. In addition, if a defect is found but the defect species cannot be identified, it may be set to an invalid state where the approval button 215 cannot be operated because the defect species to be accepted is unknown.

Figure 13:
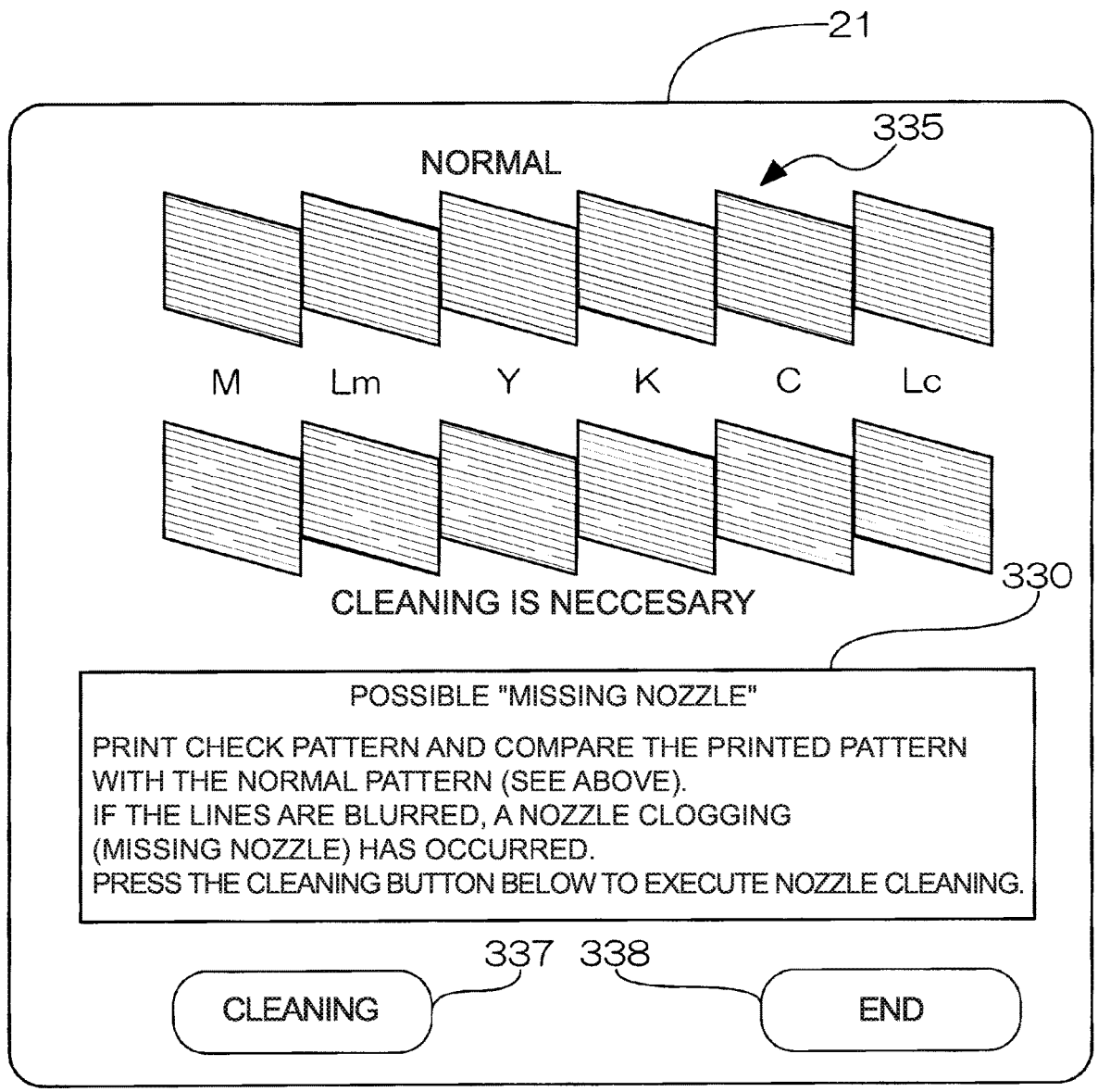
FIG. 13 is an explanatory diagram showing a maintenance process.

Which selection button was operated is discriminated (step S490), and if the user operates the approval button 215, which means that by looking at the difference image 211 and the discrimination result 212 displayed on the display section 21, the judgment as a defect species is correct, then a maintenance process is executed (step S500). The maintenance process calls the maintenance method corresponding to the discriminated defect species from the maintenance information table MIT stored in the storage device 120 and displays it on the display section 21. An example of the display of the maintenance process is shown in FIG. 13. In this example, maintenance instructions for a missing nozzle are displayed by text 330 and image 335. The contents of the maintenance process may be presented to the user by audio guidance, video, or AR display using a head mounted display, as necessary. In this example, if the user understands the contents of the maintenance process, the user operates the cleaning button 337 to instruct the printer 10 to perform the cleaning operation, sees the results, judges that the defect has been resolved, and operates the end button 338 displayed on the display section 21, the display of the maintenance process ends, exits to "END", and this process routine ends.

On the other hand, if the user operates the additional learning button 216 in the judgment of step S490, additional learning is performed (step 510), and if the user operates the reinforcement learning button 217, reinforcement learning is performed (step 520). When the additional learning button 216 is operated, that is, when the user determines that the result of the defect species discrimination by the machine learning model 200 is an unknown defect and the detected defect is different from the known defect species, a new label (defect name) is entered by the user in the field 216a, then additional learning is performed. Additional learning can also be selected when a defect was identified as known defect species, but the user determines that the detected defect is different from the known defect species. On the other hand, when the reinforcement learning button 217 is operated, this means that the user determined that although the detected defect species is known, the discrimination result of the machine learning model 200 in discriminating the defect species was incorrect. Therefore, reinforcement learning is performed by assigning the correct label to the difference image 211. The correct label (name of defect to be trained) in this case is selected from the existing labels that pop up in the field 217a.

Figure 14A:
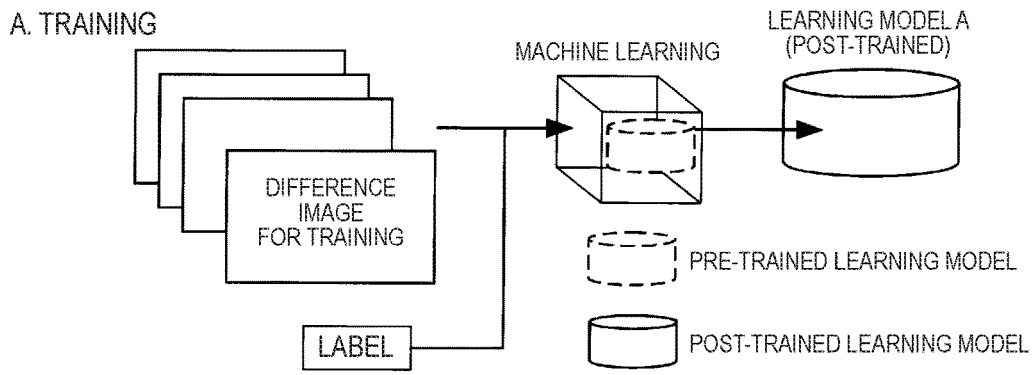
FIG. 14A is an explanatory diagram schematically showing a training method.
Figure 14B:
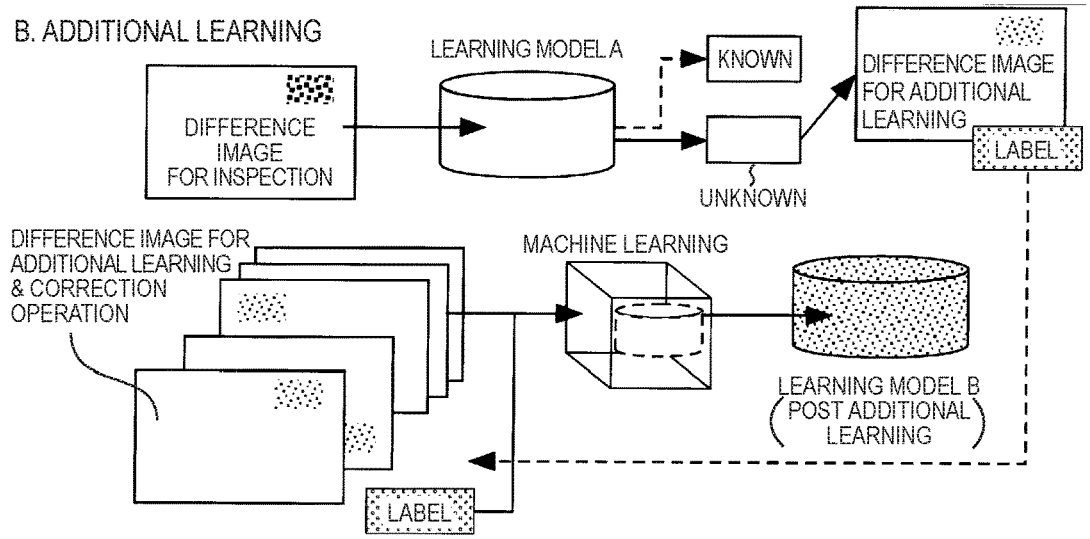
FIG. 14B is an explanatory diagram schematically showing a method of additional learning.

The methods of additional learning and reinforcement learning are shown schematically in FIGS. 14A, 14B, and 14B, along with the method of building machine learning models. FIG. 14A schematically shows the method of machine learning shown in FIG. 4. As already described, in supervised machine learning, the difference image with a label indicating the defect species is prepared, and this is trained to the learning model 200 shown in FIG. 3, resulting in the learning model A that has been trained. In the FIG. 14A, a learning model drawn with a broken line indicates the pre-trained learning model, and a learning model drawn with a solid line indicates the post-trained learning model A.

Figure 15A:
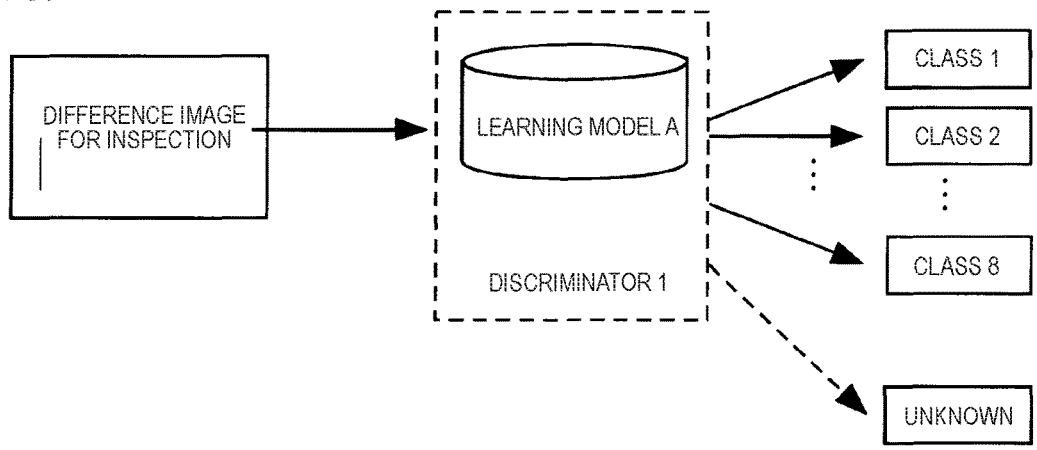
FIG. 15A is an explanatory diagram schematically showing a state of discrimination by a learning model.

The discriminator 114 having the similarity calculation section 310 and the class determination section 320 can discriminate the class (defect species) of the difference image using this learning model A. The state of discrimination in this case is shown in FIG. 15A. A scheme for discriminating the defect species using the post-trained learning model A is called a discriminator 1. The discriminator 1 uses the learning model A to determine the class (defect species) of a new difference image obtained from the printed print medium P.

FIG. 14B schematically shows how additional learning is performed. First, as shown in the upper part of FIG. 14B, the image printed on the print medium P is read, and the learning model A is applied to the difference image between this read inspection image and the reference image to discriminate the defect species presented in the inspection image. As a result of the discrimination, if the user determines that the defect is an unknown defect species, supervised machine learning is performed again using a new label and difference images for additional learning, as shown in the lower part of FIG. 14B. The learning model used in this case is the pre-trained learning model. As a result of additional learning, a new learning model B is obtained.

Figure 15B:
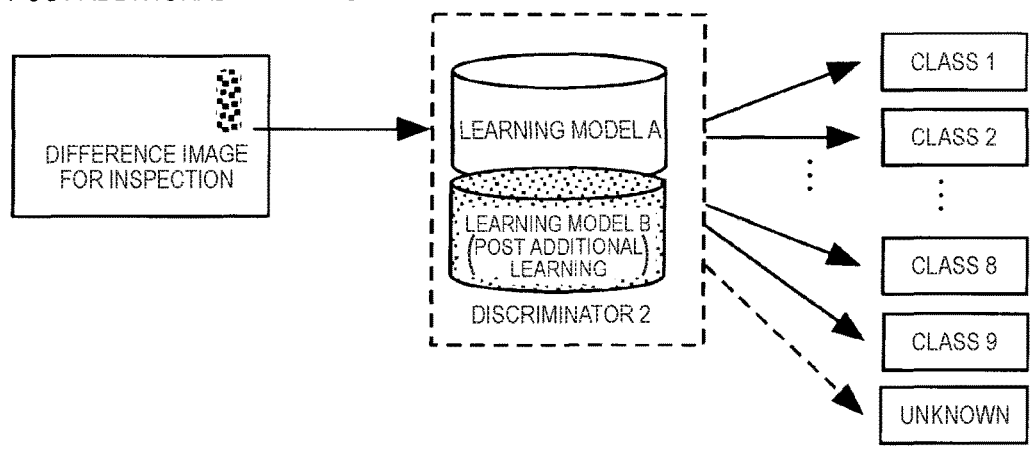
FIG. 15B is an explanatory diagram schematically showing a state of discrimination by an additional learning model.

The difference images used for such additional learning are generated by performing a prescribed operation for the original images to generate multiple difference images, which are then used for additional learning. A method of generating multiple difference images will be described in detail later. The new label for discrimination is attached to the generated multiple difference images, and supervised machine learning is performed again to obtain a learning model B which has undergone additional learning. The state of discrimination using this learning model B is shown in FIG. 15B. Since the post-trained learning model B discriminates the new defect that was the subject of additional learning, the discriminator 2, which includes this model, determines the class (defect species) of the difference image obtained from the printed print medium P using the learning model A, which was trained first, and the learning model B, which was additionally trained.

Figure 14C:
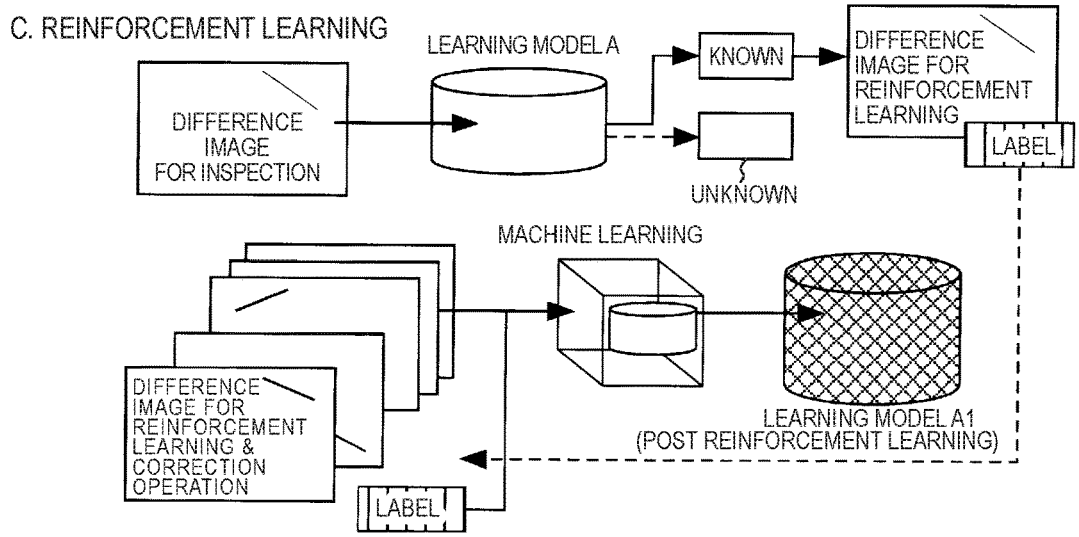
FIG. 14C is an explanatory diagram schematically showing a method of reinforcement learning.

FIG. 14C schematically shows how reinforcement learning is performed. First, as shown in the upper part of FIG. 14C, the image printed on the print medium P is read, and the learning model A is applied to the difference image between this read inspection image and the reference image to determine the defect species presented in the inspection image. As a result of the discrimination, if the user determines that the discrimination of the defect species is not correct and presses the reinforcement learning button 217 shown in FIG. 12, supervised machine learning is performed again using the label specified by the user as the relevant defect species and the difference image for reinforcement learning, as shown in the lower part of FIG. 14C. In this case, machine learning is performed using the difference images at the time of training and the difference images for reinforcement learning, for the post-trained learning model A. As a result of reinforcement learning, the learning model A becomes the learning model A1 with an enhanced ability to discriminate images with that label. It should be noted that when the correct defect species is displayed as a result of the initial discrimination using the learning model A, reinforcement learning may be performed. The difference images used for reinforcement learning are obtained by performing one or more operations on the difference image for inspection. The operation of generating multiple difference images is performed by a method described below as well as the difference images for additional learning.

Figure 15C:
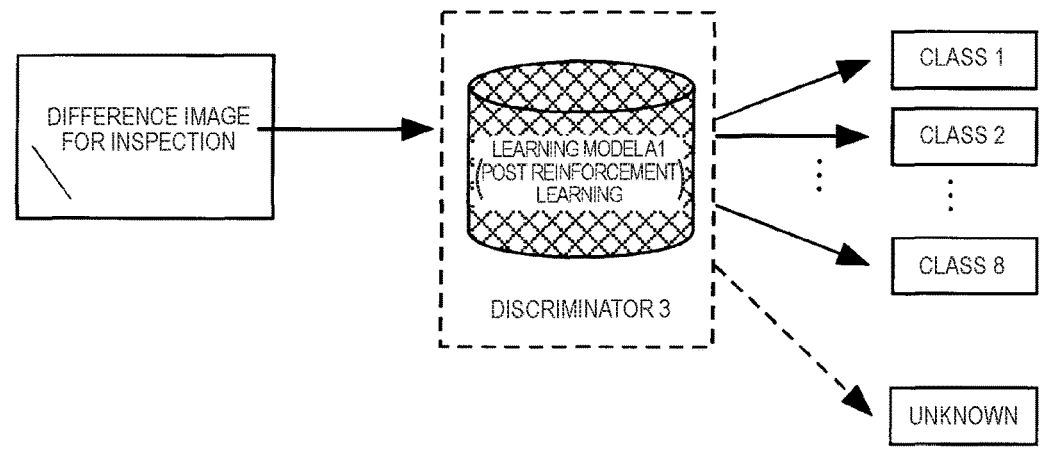
FIG. 15C is an explanatory diagram schematically showing a state of discrimination by a reinforcement learning model.

Multiple difference images thus obtained are labeled for discrimination, and supervised machine learning is performed to obtain a learning model A1 that has been trained by reinforcement learning. The state of discrimination using this learning model A1 is shown in FIG. 15C. The learning model A1, trained by reinforcement learning, is a model that enhances the ability of the post-trained learning model A to discriminate the known defects. Therefore, the discriminator 3, which performs discrimination, determines the class (defect species) of the difference image obtained from the printed print media P by using only the post-trained learning model A1.

Figure 16:
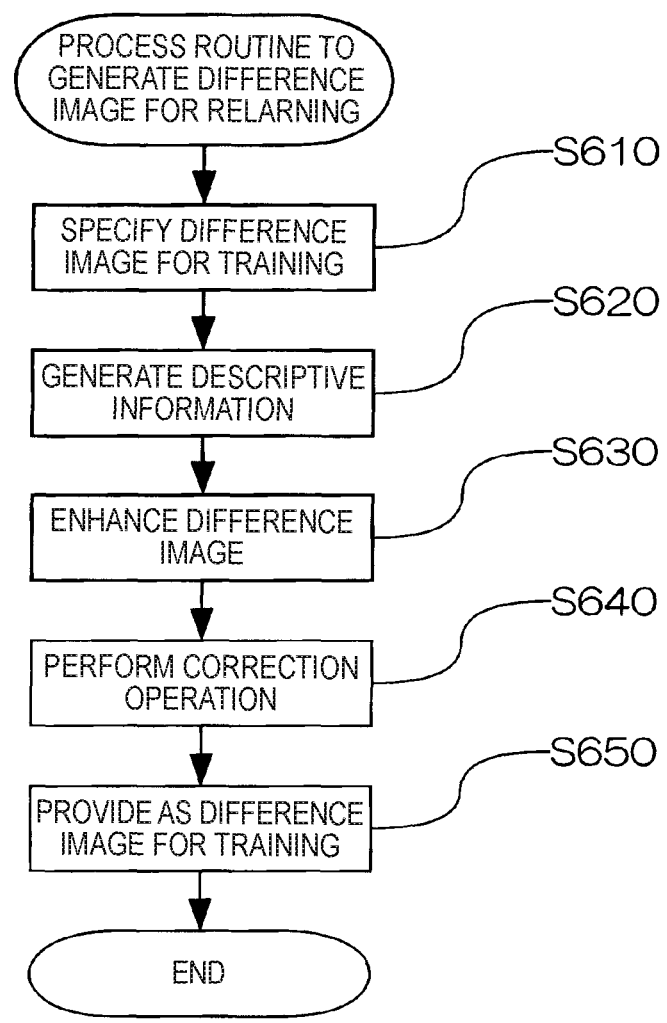
FIG. 16 is a flowchart showing a process of generating difference images used for relearning.

A method of generating multiple difference images used in additional learning and reinforcement learning will be described. FIG. 16 is a flowchart showing a process routine for generating difference images for relearning. This process routine is activated when the user presses the additional learning button 216 or the reinforcement learning button 217 in FIG. 12, and is executed by the information processing apparatus 20. When the process is started, the first step is to specify the difference image to be used for relearning (step S610). In this case, the difference image is specified when the defect species could not be discriminated correctly. When performing supervised machine learning, it is desirable to prepare multiple difference images with labels, but at this point, the only difference image that can be prepared is the difference image between the inspection image that was used for inspection and the reference image.

Next, descriptive information is generated (step S620). The descriptive information is information that indicates to which part of the image the judgement was made based on the feature spectrum output by each vector neuron layers 230, 240 and 250 of the learning model 200, for the difference information between the given inspection image and the reference image. In this embodiment, for the difference images, the final class discrimination is not obtained by the output of the ClassVN layer 250, but based on the output of the feature spectrum from the vector neuron layers 230 through 250. Thus, for each of the defect species, it is possible to know what decision was made for which part of the difference image. This is the descriptive information.

Figure 17A:
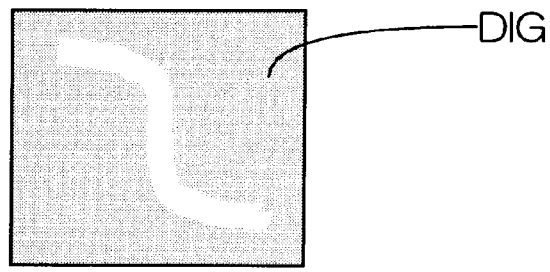
FIG. 17A is a first explanatory diagram showing a first method for generating descriptive information.
Figure 17B:
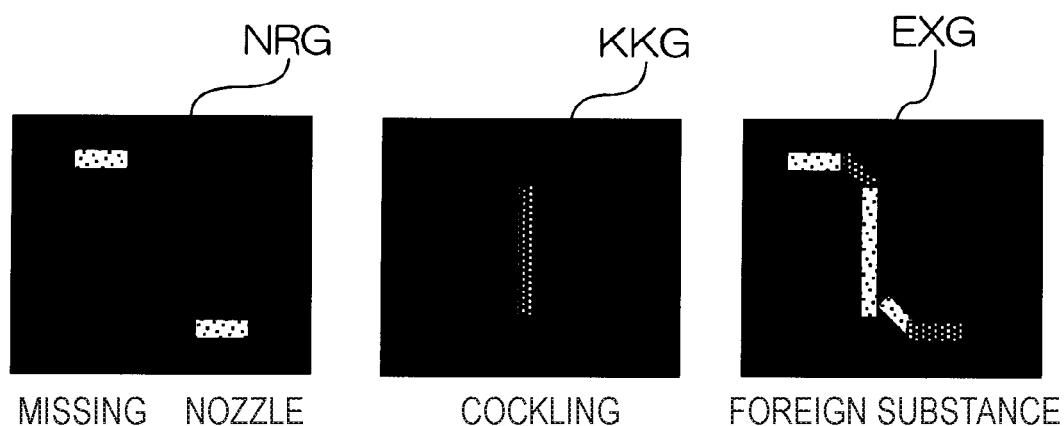
FIG. 17B is a second explanatory diagram showing the first method of generating descriptive information.

One process of using such descriptive information to obtain training information, which is used for generating the difference images, is shown in FIG. 17A. With respect to the difference image DIG while performing discrimination of defect species using the learning model A, the degree of similarity for the various defect species can be known from the feature spectrum of each vector neuron layer 230 through 250 in the learning model A. FIG. 17B shows areas of the difference images has what degree of similarity for the defect species of "missing nozzle", "cockling", and "foreign substance" in the images NRG, KKG, and EXG, respectively. In each figure, areas where the inspection image does not match the reference image are shown as highlighted areas. In the image NRG, which corresponds to the defect of the missing nozzle, the areas showing a feature spectrum with low similarity to the defect species are highly highlighted, and the similarity is low. On the other hand, in the image KKG, which corresponds to the defect of cockling, the areas showing a feature spectrum with high similarity to the cockling defect species are low highlighted, and the similarity is high. In the image EXG, which corresponds to the defect of a foreign substance, the areas showing a feature spectrum with high similarity to the foreign substance defect species are uneven and those with high similarity are low highlighted.

Figure 17C:
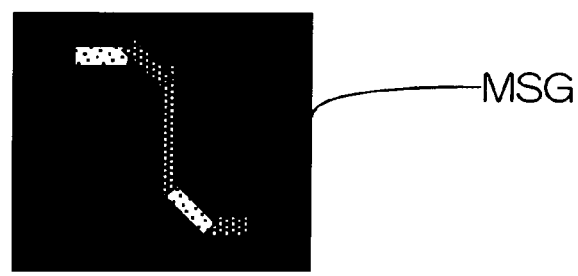
FIG. 17C is a third explanatory diagram showing the first method of generating descriptive information.

Then, the combination of the images in FIG. 17B is generated as the descriptive information for training, as shown in FIG. 17C as the image MSG. Since the descriptive information is not the image itself, the image MSG schematically shows that the descriptive information is generated for each area of the difference image as having a predetermined value (density).

Figure 18:
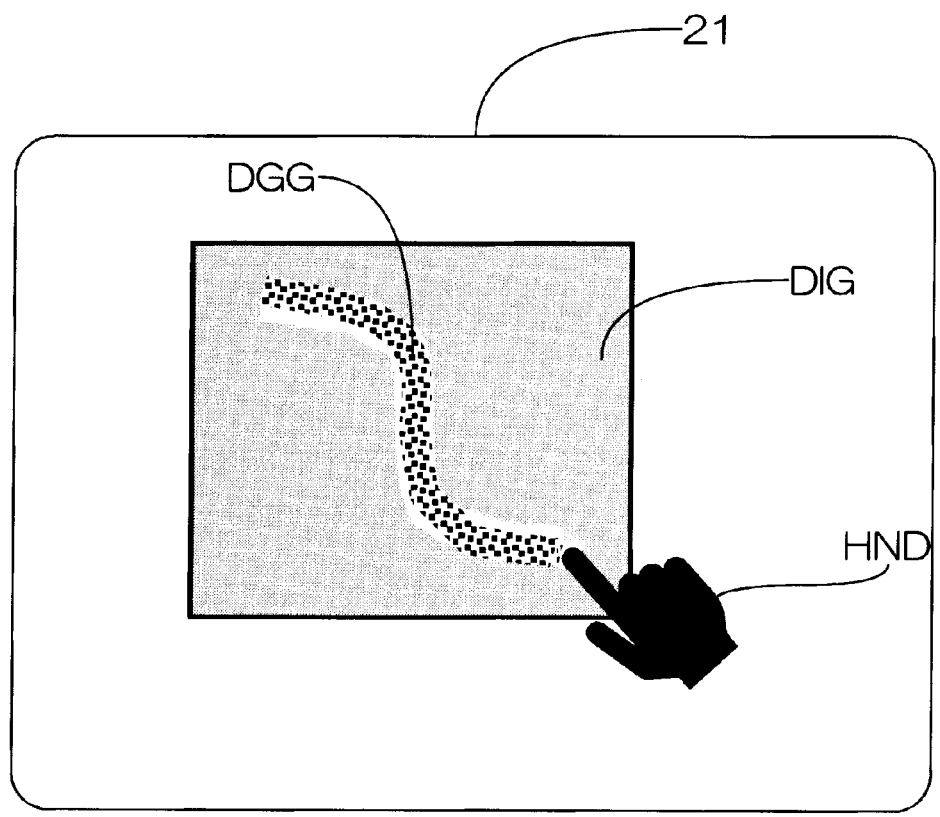
FIG. 18 is an explanatory diagram showing a second method of generating descriptive information.

A second method for generating descriptive information for training is shown in FIG. 18. In this example, the user directly draws the descriptive information DGG by operating the cursor HND while viewing the difference image DIG that discriminates the defect species displayed on the display section 21. If the display section 21 is equipped with a touch panel, the range of the descriptive information may be indicated by directly tracing on the screen, instead of using the cursor. The density may be changed by changing the drawing speed, for example, an area drawn slowly may be displayed darker, and that part of the difference image may be emphasized.

Once the descriptive information for training is generated by this method (step S620), the difference images used for relearning are enhanced using this information (step S630). Specifically, the corresponding areas of the difference image are emphasized according to the density of the highlight portion of the image MSG. Emphasis is performed by increasing the brightness of the difference image according to the density of the emphasis information.

Next, a correction operation is performed on the enhanced difference image to generate multiple images (step S640). This correction operation performs multiple operations on the difference images used for the inspection, and generates multiple difference images for relearning. Such operations include, for example, the following operations:

Operation 1: operation of rotating the difference image by a predetermined angle, for example, 90 degrees, to obtain rotated images, Operation 2: operation of translating the difference image by a predetermined distance, for example, ¼ of the image width, to obtain moved images, and Operation 3: operation of flipping the difference image over to obtain inverted images.

Although it is not necessary to perform all of these operations, if operations 1 to 3 are performed in sequence, the original difference image, three types of rotated images, their horizontally shifted images (4×3 images), their vertically shifted images (16×3 images), and their inverted images (64 images) are obtained. These methods are used to generate multiple difference images for additional learning. Note that the selection and combination of multiple operations, pre- and post-operation relationships, and the like, are arbitrary. Increasing the number of difference images for training through the correction process generally improves the accuracy of the discrimination result by training.

The multiple difference images thus obtained are provided as the difference images for relearning (step S650), and then exit to "END" to end this process routine. The provision of multiple difference information is received, additional learning or reinforcement learning is performed as shown in FIGS. 14B and 14C, and a new learning model B, or the learning model A1 that is an enhancement of the existing learning model A, is obtained.

According to the discrimination system 100 of the first embodiment described above, the learning model is constructed to discriminate the defect species contained in images printed by the printer 10, by training using, as training data, multiple difference images with differences between an image containing defect species and a reference image containing no defects. As a result, it is possible to accurately discriminate the defect species that may be contained in the printed image. Moreover, when the discrimination system 100 cannot correctly discriminate a defect species existing in the printed image as a known defect species, machine learning can be performed again to improve the discrimination accuracy. Further, by training unknown defect species, the types of discriminable defect species can be gradually increased.

Further, in this embodiment, the feature spectrum output from the specific layers 230 through 250, which are vector neuron layers, and the known feature information stored in advance in the storage device 120 are used for the class discrimination to discriminate similarity. Therefore, class discrimination based on similarity can be performed with high accuracy. Furthermore, in relearning that is performed when an unknown defect species that cannot be discriminated is found or when a defect species is incorrectly discriminated, the descriptive information obtained from the specific layers 230 through 250 can be used to emphasize the differential information that will used for training, and relearning efficiency can be enhanced.

B. Second Embodiment

Figure 19:
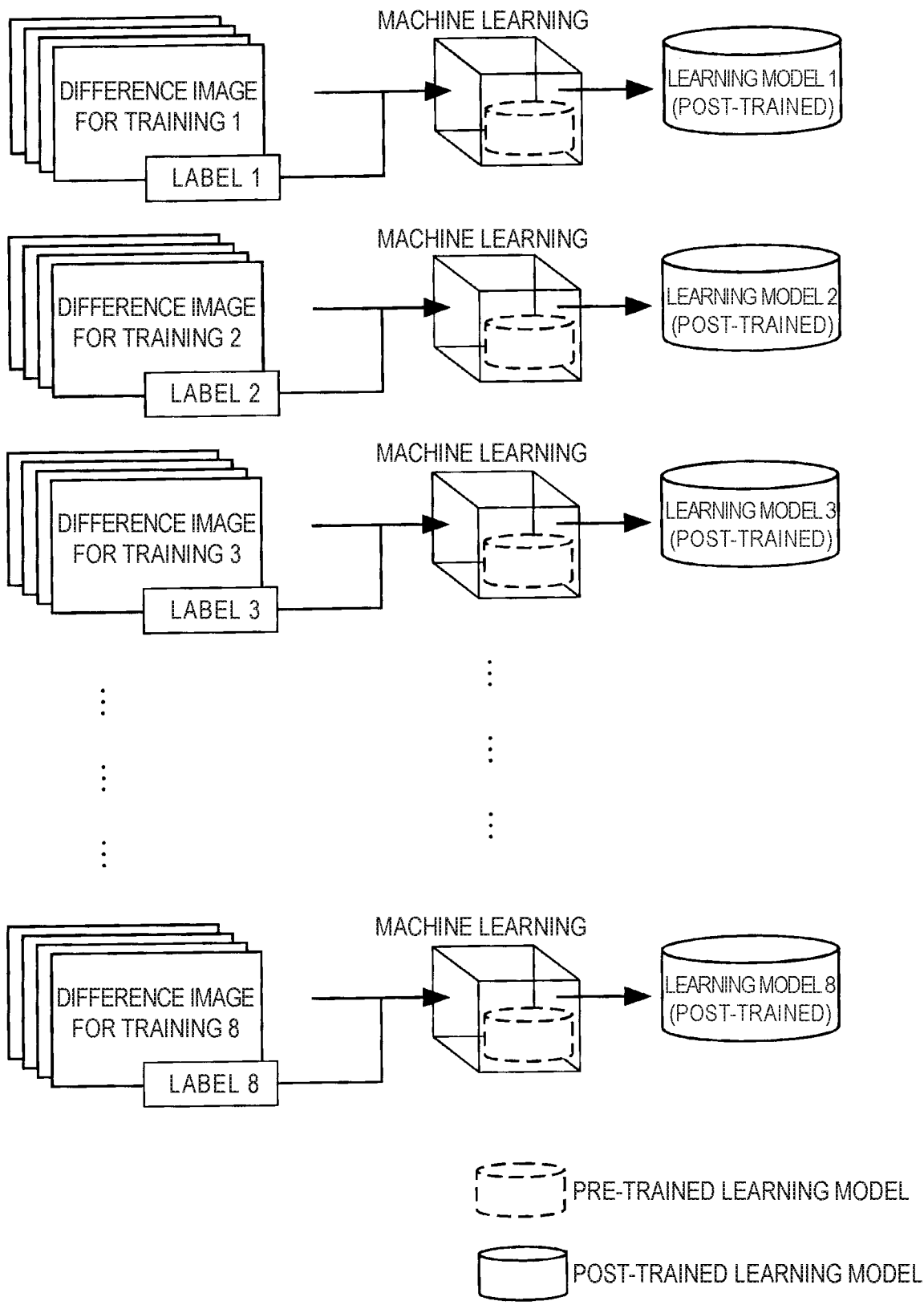
FIG. 19 is an explanatory diagram showing a configuration in the case where a learning model is prepared for each label.

Next, a second embodiment of the discrimination system 100 will be described. The discrimination system 100 of the second embodiment differs from that of the first embodiment in that the learning model 200, which discriminates the defect species in printed images, uses plural learning models, prepared for each defect species, rather than using a single learning model to discriminate plural defect species. FIG. 19 is an explanatory diagram showing how supervised machine learning of the learning model 200 is performed in the second embodiment. In the second embodiment, assuming there are eight defect species in the images to be printed, difference images 1 through 8 for training, along with labels 1 through 8 indicating type of defect species, are prepared for the defect species. The learning model 200 for training is similar to the learning model shown in FIG. 3 of the first embodiment, but differs in that there is only one channel (n1=1) in the ClassVN layer 250. In the second embodiment, unlike the first embodiment, a learning model 200 is prepared for each defect species, and the preparation process shown in FIG. 4 is performed for each learning model 200. As a result, eight different learning models 1 through 8 are trained for eight different defect species, as shown in FIG. 19.

Figure 20:
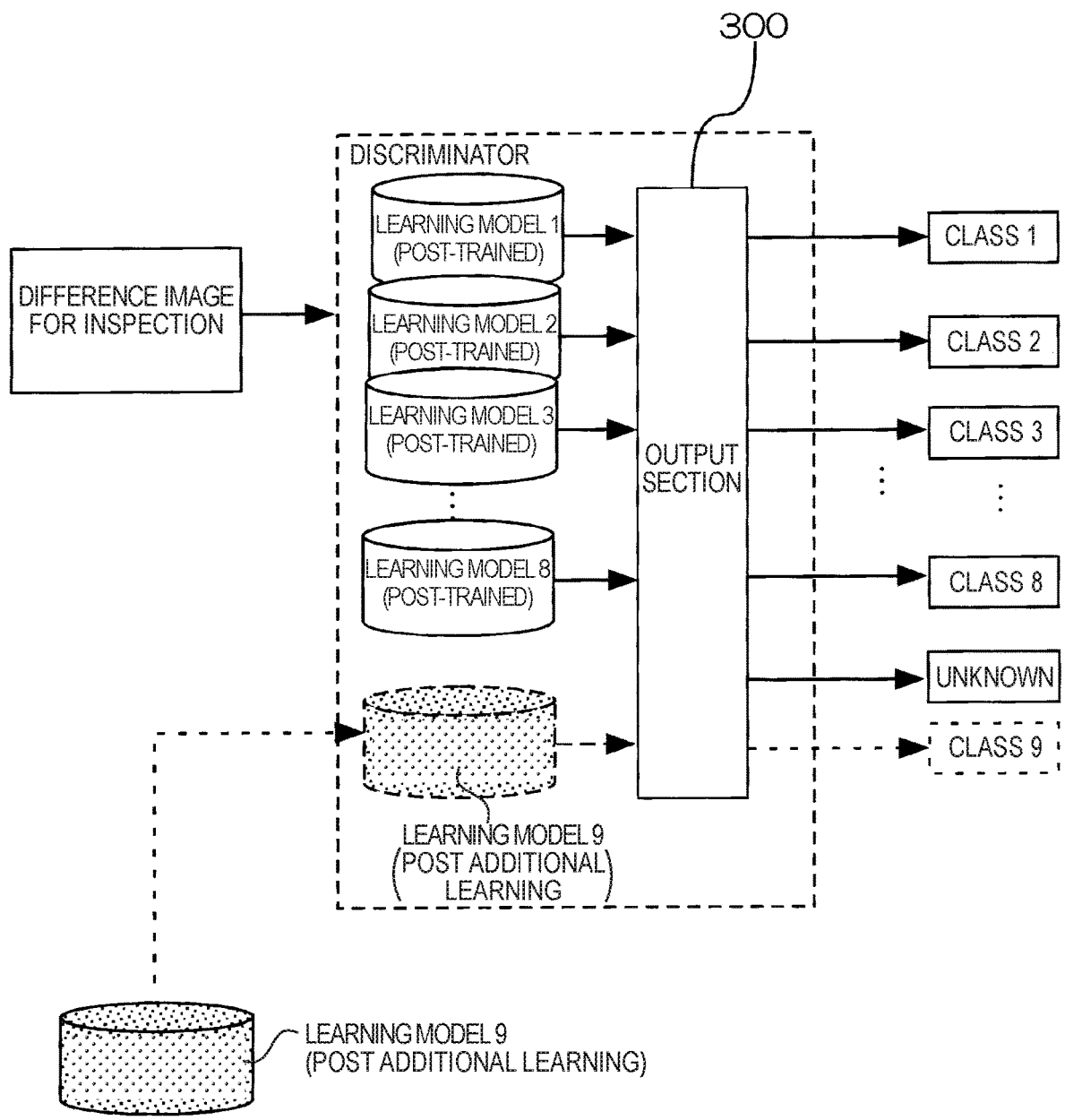
FIG. 20 is a schematic diagram showing a state of defect species discrimination when the learning model is constructed for each label.

These learning models 1 through 8 are aggregated to constitute a discriminator, as shown in FIG. 20. When a difference image for inspection that was generated from the image printed on a print medium P is input to the discriminator, the difference image is input to all post-trained learning models 1 through 8, and each learning model 1 to 8 outputs one of the similarities Sclass_ConvVN1, Sclass_ConvVN2, Sclass ClassVN from the three vector neuron layers 230, 240, 250 as the similarity of the defect species for which the learning models 1 through 8 were trained. The discriminator has an output section 300. The output of the eight learning models 1 through 8 is input into the output section 300 and the defect species that was discriminated by the learning model that output the highest similarity value is output from the output section 300 as the defect species present it the printed image.

If no similarity of any defect species output by the learning models 1 through 8 exceeds a predetermined threshold ThS, then the output section 300 outputs "no defect" as there is no defect in the inspection image. If the discrimination result of the defect species output by the discriminator is incorrect and the user judges that the detected defect is a new defect, then additional learning is performed as in the first embodiment, and a new learning model 9 is formed by additional learning, which is added to the discriminator and its output is connected to the output section 300. In this way, new defect species can be handled in the same way as in the first embodiment. Also, as in the first embodiment, reinforcement learning may be performed to increase the accuracy of discrimination for each defect species. The difference images used as training data in such relearning can be generated in a plurality from a single difference image by using the same method as in the first embodiment.

The discrimination system 100 of the second embodiment has the same effects as the first embodiment, and also has an advantage of being able to easily respond to new defect species and easily replace post-trained learning models because a learning model is prepared and trained for each defect species. Even if one learning model is trained with an incorrectly labeled difference image, then only that learning model needs to be replaced.

C. Other Embodiments (1) Other embodiments of this disclosure will be described. One of the other embodiments is in the form of a defect discrimination apparatus for printed images. Such a defect discrimination apparatus for printed images includes a reference image setting section that prepares a reference image that serves as a reference for an image in which a defect is to be detected; a learning model that has undergone machine learning in advance using a teacher image, the learning model being configured to output similarity for each defect species; a target image acquisition section that acquires an image of printed matter, which has been printed, and that prepares a target image to be an inspection target; a discriminator that, with respect to the target image, uses the learning model to acquire similarity of a defect present in the target image to the defect species, and that discriminates the defect present in the target image as at least one known defect species; and a learning section that, when updating the learning model based on a discrimination result by the discriminator, causes the learning model to undergo machine learning for a defect species that is different from the discriminated defect species or that is associated with an unknown defect.

According to this defect discrimination apparatus for printed images, various defects that may occur in printed images can be easily discriminated. Moreover, when it is determined that learning is necessary for the aforementioned learning model as the result of the discrimination of defects present in the target image being inspected, the learning model is caused to undergo machine learning for a defect species that is different from the discriminated defect species or that is associated with an unknown defect. Therefore, it is possible to discriminate defects that could not be discriminated as known defects or that are unknown defects. A case of when the user sees the discrimination result and determines that training is necessary, or a case of when it is determined that the similarity is not high enough for any of the previously learned defect species can be considered as examples of when it is determined that training is necessary for the learning model.

(2) As the defects in the printed images, for example, defects such as banding, dripping, missing nozzle, pinhole, foreign substance, distortion, cockling, and color variation can be discriminated. These defects may occur in duplicate, but one of them may be possible to discriminate using similarity obtained from the post-trained learning model, or the combined defects may be discriminated simultaneously. In the former case, the one with the largest similarity should be identified as a defect, and in the latter case, for example, if any of the similarities are larger than a certain value, all of them should be identified as defects.

(3) For supervised machine learning, existing methods such as deep learning using neural networks can be employed and whether the configuration uses or does not use a vector neuron layer is not a problem. The number of layers of the neural network and the number of pixels in the input image can be set arbitrarily.

(4) The defect discrimination apparatus for printed images may be integrated with a printing apparatus such as a printer that prints images, or it may be configured as a stand alone apparatus that receives the target image and discriminates defect. Also, a part of the apparatus configuration may be distributed over a network. For example, a device may be separately provided for performing machine learning in advance using a teacher image, which is an image that contains a defect that may occur during printing and which is associated with the defect species, and for generating a post-trained learning model capable of outputting similarity for each defect species, and the post-trained learning model may be accessed via a network. The learning section may be separately provided and when the discriminator fails to discriminate a defect present in the target image as a known defect, then the learning section may be called via the network to perform machine learning with respect to the defect that could not be discriminated as a known defect and then it is made available after learning.

(5) In such a configuration, when there is no value higher than a predetermined threshold within the similarities obtained for the known defects, the discriminator may discriminate that the defect present in the target image is an unknown defect. In this way, an unknown defect can be easily detected. Of course, since the printed image is free of defects, none of the similarities obtained for the known defects will be above a predetermined threshold. However, in such a case, the user may correct the discrimination result by looking at the difference image used for the inspection.

(6) In such a configuration, when the discriminator discriminates that a defect present in the target image as an unknown defect, then the learning section may, upon receiving a specification of a new defect species, which corresponds to the unknown defect, perform on the learning model additional learning of a new model which will enable discrimination of the new defect species. In this way, new defects can be easily learning and then correctly discriminated. Moreover, in this case, additional learning is performed for the new model instead of on the previously trained learning model, so the discrimination of the existing learning model is not affected.

(7) In such a configuration, the designation as a new defect may be made by the user setting an arbitrary defect species label. In this way, unknown defects can be easily labeled as new defects by the user of the apparatus. Of course, a label may be set for a new defect by automatically assigning a serial number to the new defect.

(8) In this configuration, when the discriminator is determined to have misjudged the defect present in the target image, the learning section may perform reinforcement learning of the learning model upon a specification that the misjudged defect is a defect species associated with one of the other known defect species or an unknown defect. In this way, the learning model can be modified to avoid misjudgment. Of course, the reinforcement learning is not limited to cases where the discriminator is judged to have misjudged a defect present in the target image, but may also be made to perform reinforcement learning when the discriminator has judged the defect correctly.

(9) In such a configuration, the above designation of one of another known defect species, may be made by selecting a defect species from among defect species that were learning in advance. In this way, the occurrence of misjudgments, where a previously trained the defect species was not discriminated, can be reduced by reinforcement learning.

(10) In such a configuration, a target image acquisition section further includes: a reference image setting section that prepares a reference image that serves as a reference for an image in which a defect is to be detected; an inspection image acquisition section that acquires an inspection image by capturing printed matter on which an image corresponding to the reference image is printed; and a difference image generation section that generates, as the target image, a difference image, which is an extracted difference between the reference image and the inspection image; wherein the learning model may be a learning model in which machine learning is performed by using a difference image as a teacher image, the difference image being a difference between an image, which contains a known defect occurring in the printed matter, and an original image of the image. In this way, defects can be easily trained and discriminated because the difference image between the reference image and the inspection image is used as the target image. The difference image between the reference image and the inspection image may be specified as a difference between the two images by calculating the brightness (luminance) of both images, or if the image is separable into hues such as RGB, it may be specified as the difference for each hue data. The reference image for obtaining the difference may be an image printed in a condition adjusted to avoid defects, or it may be formed by image processing from the original image data for printing. The target image is not limited to the difference image. For example, a scanned image of printed matter of a uniform image in a predetermined gray scale may be used as the target image. Images, such as a target image, a reference image, and an inspection image, are not limited to images printed on a print medium, but also include those that are handled as they are in image data format.

(11) In this configuration, the learning section may perform the machine learning using difference images, perform a correction operation to generate multiple types of difference images from the difference image corresponding to a defect species different from the discriminated defect species or to defect species associated with an unknown defect, and perform machine learning using the generated multiple types of difference images. In this way, the number of types of supervised training data can be increased based on a small number of difference images, and the effectiveness of machine learning, such as additional learning or reinforcement learning, performed by the learning section can be increased. Various types of correction operations can be employed, such as rotating the difference images by a predetermined angle, for example, 90 degrees, to obtain respective rotated images, translating the difference image by a predetermined distance, for example, ¼ of the image width, to obtain respective shift images, or inverting the difference images to obtain inverted images. Of course, the correction operation may not be performed, but rather additional learning or reinforcement learning may be performed collectively after multiple similar unknown defects or misjudged defects have accumulated.

(12) In such a configuration, the learning section may perform an enhancement process for the difference image corresponding to the descriptive information generated by the discriminator in the discrimination during the correction operation, and perform machine learning, for example, additional learning or reinforcement learning, using the difference image in which the defect has been enhanced. In this way, machine learning such as additional learning or reinforcement learning can be performed efficiently. If the learning model has a structure that can output descriptive information based on the similarity, this can be used as the descriptive information, that is, the user can simply input and use the descriptive information.

(13) In such a configuration, the difference image generation section may include a preprocess section that performs preprocessing on at least one of the reference image and the inspection image to reduce differences other than the defect between the reference image and the inspection image. In this way, the portion corresponding to the defect can be efficiently extracted as a difference image. Of course, if the reference image and the inspection image are acquired with the same scanner or camera, the difference image may be generated without such preprocessing.

(14) In this configuration, the preprocess section may perform at least one of level correction, geometric correction, and alignment of at least one of the reference image and the inspection image as a preprocess. In this way, noise in the difference image can be reduced.

(15) In such a configuration, the geometric correction may include any one of enlargement, reduction, and rotation of at least one of the reference image and the inspection image. In this way, geometric errors in generating the difference image can be reduced.

(16) In such a configuration, the alignment may be performed by pattern matching the reference image and the inspection image. In this way, errors based on misalignment in generating the difference image can be reduced.

(17) In such a configuration, the teacher images may include images derived from the correction operation based on said teacher image. In this way, the number of types of teacher images can be increased and the efficiency of training can be improved.

(18) One of the other embodiments of this disclosure is a aspect of a defect discrimination method for inspection images. A defect discrimination method for such an inspection image includes, preparing a learning model that has undergone machine learning using a teacher image, the teacher image containing a defect that may occur during printing and being associated with a defect species, the learning model being configured to output similarity for each defect species; acquiring an image of printed matter, which has been printed, and preparing a target image as an inspection target; using, with respect to the target image, the learning model to acquire similarity of a defect present in the target image to a defect species, and discriminating the defect present in the target image as at least one of a known defect species; and when updating the learning model based on the discrimination result, performing machine learning for a defect species that is different from the discriminated defect species or that is associated with an unknown defect. In this way, various defects that may occur in the printed images can be easily discriminated. Moreover, when updating the aforementioned learning model from the results of discrimination of defect present in the target image to be inspected, the learning model is made to perform machine learning for defect species that are different from the discriminated defect species or that are associated with unknown defects, so that defects that could not be discriminated as known defects or unknown defects can be discriminated.

(19) In each of the above embodiments, a part of the configuration realized by hardware may be replaced by software. At least a part of the configurations realized by software can also be realized by discrete circuit configurations. In addition, when some or all of the functions of the present disclosure are realized in software, the software (computer program) can be provided in the form stored in a computer readable recording medium. The term "computer readable recording medium" is not limited to portable recording media such as flexible disks or a CD-ROMs, but also includes internal storage devices in computers such as various types of RAM and ROM, and external storage devices fixed in computers such as hard disks. In other words, "computer readable recording medium" has a broad meaning that includes any recording medium in which data packets can be permanent, rather than temporary.

The present disclosure is not limited to the embodiments described above, but can be realized in various configurations to the extent that the intent is not departed from. For example, the technical features in the embodiments corresponding to the technical features in each of the aspects described above can be replaced or combined as appropriate to solve some or all of the above issues or to achieve some or all of the above effects. In addition, if a technical feature is not described as an essential feature in the present specification, the technical features can be omitted as appropriate.

What is claimed is:

1. A defect discrimination apparatus for printed images, comprising:
    a learning model that has undergone machine learning using a teacher image, the teacher image containing a defect that may occur during printing and being associated with a defect species, the learning model being configured to output similarity for each defect species;
    a target image acquisition section that acquires an image of printed matter, which has been printed, and that prepares a target image to be an inspection target;
    a discriminator that, with respect to the target image, uses the learning model to acquire similarity of a defect present in the target image to the defect species, and that discriminates the defect present in the target image as at least one known defect species; and
        a learning section that, when updating the learning model based on a discrimination result by the discriminator, causes the learning model to undergo machine learning for a defect species that is different from the discriminated defect species or that is associated with an unknown defect.

2. The defect discrimination apparatus for printed images according to claim 1, wherein:
    when none of the similarities obtained for each known defect species is equal to or greater than a predetermined threshold value, the discriminator discriminates the defect present in the target image as an unknown defect.

3. The defect discrimination apparatus for printed images according to claim 2, wherein:
    when the discriminator discriminates that the defect present in the target image is an unknown defect, then the learning section, upon receiving a specification of a new defect species that corresponds to the unknown defect, performs additional learning with respect to the learning model for a new model configured to discriminate the new defect species.

4. The defect discrimination apparatus for printed images according to claim 3, wherein:
    the specification of the new defect species is made by the user setting an arbitrary defect species label.

5. The defect discrimination apparatus for printed images according to claim 1, wherein:
    when the discriminator is determined to have misjudged the defect present in the target image, the learning section, upon receiving the specification that the misjudged defect is one of other known defect species, performs reinforcement learning of the learning model.

6. The defect discrimination apparatus for printed images according to claim 5, wherein:
    the specification of the one of other known defect species, is made by selecting a defect species from among defect species for which training was performed in advance.

7. The defect discrimination apparatus for printed images according to claim 1, wherein the target image acquisition section further includes:
    a reference image setting section that prepares a reference image that serves as a reference for an image in which a defect is to be detected;
    an inspection image acquisition section that acquires an inspection image by capturing printed matter on which an image corresponding to the reference image is printed; and
    a difference image generation section that generates, as the target image, a difference image, which is an extracted difference between the reference image and the inspection image; wherein,
    the learning model is a learning model in which machine learning is performed by using the difference image as the teacher image, the difference image being a difference between an image, which contains a known defect occurring in the printed matter, and an original image of the image.

8. The defect discrimination apparatus for printed images to claim 7, wherein:
    the learning section performs the machine learning by using the difference image, performs a correction operation to generate multiple types of difference images from the difference image that corresponds to a defect species different from the discriminated defect species or to a defect species associated with an unknown defect, and performs machine learning using the generated multiple types of difference images.

9. The defect discrimination apparatus for printed images according to claim 8, wherein:
    during the correction operation, the learning section performs an enhancement process on the difference image, the enhancement process corresponding to descriptive information generated by the discriminator in the discrimination, the learning section performing machine learning using the difference image in which the defect was enhanced.

10. The defect discrimination apparatus for printed images according to claim 7, wherein
    the difference image generation section includes a preprocess section that performs a preprocess on at least one of the reference image and the inspection image to reduce differences other than the defect between the reference image and the inspection image.

11. The defect discrimination apparatus for printed images according to claim 10, wherein:
    the preprocess section performs at least one of level correction, geometric correction, and alignment of at least one of the reference image and the inspection image as the preprocess.

12. The defect discrimination apparatus for printed images according to claim 11, wherein:

the geometric correction includes any one of enlargement, reduction, and rotation of at least one of the reference image and the inspection image.

13. The defect discrimination apparatus for printed images according to claim 11, wherein:
the alignment is performed by pattern matching the reference image and the inspection image.

14. The defect discrimination apparatus for printed images according to claim 1, wherein:
the teacher image includes an image derived from the correction operation based on the teacher image.

15. A defect discrimination method for printed images, the method comprising:
preparing a learning model that has undergone machine learning using a teacher image, the teacher image containing a defect that may occur during printing and being associated with a defect species, the learning model being configured to output similarity for each defect species;
acquiring an image of printed matter, which has been printed, and preparing a target image as an inspection target;
using, with respect to the target image, the learning model to acquire similarity of a defect present in the target image to a defect species, and discriminating the defect present in the target image as at least one of a known defect species; and
when updating the learning model based on the discrimination result, performing machine learning for a defect species that is different from the discriminated defect species or that is associated with an unknown defect.

* * * * *